(12) United States Patent
Lawson et al.

(10) Patent No.: US 10,165,015 B2
(45) Date of Patent: Dec. 25, 2018

(54) SYSTEM AND METHOD FOR REAL-TIME COMMUNICATION BY USING A CLIENT APPLICATION COMMUNICATION PROTOCOL

(71) Applicant: Twilio, Inc., San Francisco, CA (US)

(72) Inventors: Jeffrey Lawson, San Francisco, CA (US); John Wolthuis, San Francisco, CA (US); Evan Cooke, San Francisco, CA (US); Jonas Borjesson, San Francisco, CA (US); Rob Simutis, San Francisco, CA (US); Brian Tarricone, San Francisco, CA (US); Edward Kim, San Francisco, CA (US); Ameya Lokare, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

(21) Appl. No.: 15/404,751

(22) Filed: Jan. 12, 2017

(65) Prior Publication Data

US 2017/0142166 A1 May 18, 2017

Related U.S. Application Data

(63) Continuation of application No. 14/054,254, filed on Oct. 15, 2013, now abandoned, which is a
(Continued)

(51) Int. Cl.
| | |
|---|---|
| *H04L 29/06* | (2006.01) |
| *H04L 29/08* | (2006.01) |
| *H04W 76/10* | (2018.01) |

(52) U.S. Cl.
CPC ...... *H04L 65/1069* (2013.01); *H04L 63/0807* (2013.01); *H04L 65/1023* (2013.01); *H04L 65/1046* (2013.01); *H04W 76/10* (2018.02)

(58) Field of Classification Search
CPC ............ H04L 65/1069; H04L 65/1046; H04L 65/1023
(Continued)

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

"Ethernet to Token Ring Bridge"—Black Box Network Services, Oct. 1999 http://www2.blackboxab.se/Datablad/17044.pdf.*
(Continued)

*Primary Examiner* — Randy A Scott
(74) *Attorney, Agent, or Firm* — Schwegman Lundberg & Woessner, P.A.

(57) ABSTRACT

A system and method for communicating with a client application that can include establishing a client signaling communication channel with a first client application; receiving a communication request from the first client application through the client signaling communication channel, wherein the communication request contains at least an authentication token and a specified communication destination; verifying the authentication token; if the authentication token is verified, at the system bridge, establishing a signaling communication channel with the communication destination and a second media communication channel with the specified communication destination; at the system bridge, establishing a first media communication channel with the client application; and merging the first media
(Continued)

communication channel with the second media communication channel.

12 Claims, 25 Drawing Sheets

Related U.S. Application Data continuation-in-part of application No. 13/624,739, filed on Sep. 21, 2012, now Pat. No. 9,648,006, application No. 15/404,751, filed on Jan. 12, 2017, which is a continuation of application No. 14/054,254, filed on Oct. 15, 2013, now abandoned, which is a continuation-in-part of application No. 13/478,495, filed on May 23, 2012, now Pat. No. 9,398,622.

(60) Provisional application No. 61/537,217, filed on Sep. 21, 2011, provisional application No. 61/489,189, filed on May 23, 2011, provisional application No. 61/500,549, filed on Jun. 23, 2011.

(58) Field of Classification Search
USPC ..... 709/228; 370/255, 258, 400, 401; 726/8, 726/27, 28
See application file for complete search history.

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,252 B1 * | 7/2001 | Hutchings ............ H04W 88/08 370/466 |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,885,737 B1 | 4/2005 | Gao et al. |
| 6,874,084 B1 | 5/2005 | Dobner et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters Samuel M |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |

(56) References Cited

U.S. PATENT DOCUMENTS

| | | |
|---|---|---|
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress |
| 8,045,689 B2 | 10/2011 | Provenzale et al. |
| 8,046,378 B2 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,082,576 B2 | 12/2011 | Flynn et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran, Sr. et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |

(56) References Cited

U.S. PATENT DOCUMENTS

| | | |
|---|---|---|
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Francis et al. |
| 8,819,133 B2 | 8/2014 | Wang |
| 8,825,746 B2 | 9/2014 | Ravichandran |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,648,006 B2 | 5/2017 | Lawson et al. |
| 2001/0038624 A1 | 11/2001 | Greenberg et al. |
| 2001/0043684 A1 | 11/2001 | Guedalia et al. |
| 2001/0047406 A1* | 11/2001 | Araujo ............... H04L 29/06 709/223 |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Martino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslaysky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra |
| 2005/0289222 A1 | 12/2005 | Sahim |
| 2006/0008065 A1 | 1/2006 | Longman et al. |

(56) References Cited

U.S. PATENT DOCUMENTS

| | | |
|---|---|---|
| 2006/0008073 A1 | 1/2006 | Yoshizawa et al. |
| 2006/0008256 A1 | 1/2006 | Khedouri et al. |
| 2006/0015467 A1 | 1/2006 | Marken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams |
| 2006/0256816 A1 | 11/2006 | Yarlagadda et al. |
| 2006/0259307 A1* | 11/2006 | Sanders ............... G06F 17/289 705/26.1 |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0124536 A1 | 5/2007 | Carper |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0250635 A1* | 10/2007 | Hamilton ........... H04N 7/17318 709/231 |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling |
| 2008/0162482 A1 | 7/2008 | Ahem et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Schwartz |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |

(56) References Cited

U.S. PATENT DOCUMENTS

| | | |
|---|---|---|
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari |
| 2010/0217982 A1 | 8/2010 | Brown et al. |
| 2010/0232594 A1 | 9/2010 | Lawson |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma |
| 2011/0143714 A1 | 6/2011 | Keast |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0019297 A1 | 1/2013 | Lawson et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshaysky Alex |
| 2014/0025503 A1 | 1/2014 | Meyer et al. |
| 2014/0044123 A1 | 2/2014 | Lawson et al. |
| 2014/0058806 A1 | 2/2014 | Guenette et al. |
| 2014/0064467 A1 | 3/2014 | Lawson |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters |
| 2014/0105372 A1 | 4/2014 | Nowack et al. |

(56) References Cited

U.S. PATENT DOCUMENTS

| | | |
|---|---|---|
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm |
| 2014/0355600 A1 | 12/2014 | Lawson |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, II |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis |
| 2016/0239770 A1 | 8/2016 | Batabyal et al. |
| 2016/0323320 A1 | 11/2016 | Lawson et al. |
| 2017/0339283 A1 | 11/2017 | Chaudhary et al. |

FOREIGN PATENT DOCUMENTS

| | | | |
|---|---|---|---|
| EP | 1464418 A | 10/2004 | |
| EP | 1522922 A2 | 4/2005 | |
| EP | 1770586 A1 | 4/2007 | |
| EP | 2053869 A1 | 4/2009 | |
| ES | 2134107 A | 9/1999 | |
| JP | 10294788 | 4/1998 | |
| JP | 2004166000 A | 6/2004 | |
| JP | 2004220118 A | 8/2004 | |
| JP | 2006319914 A | 11/2006 | |
| WO | 9732448 A | 9/1997 | |
| WO | 2002087804 | 11/2002 | |
| WO | 2006037492 A | 4/2006 | |
| WO | 018489 | 2/2009 | |
| WO | WO 2009018489 A2 | 2/2009 | |
| WO | 2009124223 A | 10/2009 | |
| WO | 2010037064 | 4/2010 | |
| WO | 2010040010 A | 4/2010 | |
| WO | WO 2010/037064 A1 | 4/2010 | |
| WO | 2010101935 A | 9/2010 | |
| WO | 2011091085 A | 7/2011 | |
| WO | WO-2012162397 A1 | 11/2012 | |

OTHER PUBLICATIONS

"Ethernet to Token ring Bridge"—Black Box Corporation, Oct. 1999 http://blackboxcanada.com/resource/files/productdetails/17044.pdf.

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.

Archive Microsoft Office 365 Email | Retain Unified Archiving, 2015, GWAVA, Inc., Montreal, Canada.

Complaint for Patent Infringement, *Telinit Technologies, LLC* v. *Twilio Inc.*, dated Oct. 12, 2012.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Twilio Cloud Communications—APIs for Voice, VoIP, and Text Messaging, Twilio.

Wu et al. "Quality Evaluation in Peer-to-Peer IPTV Services" Data Traffic and Monitoring Analysis, LNCS 7754. pp. 302-319. 2013.

"U.S. Appl. No. 13/478,495, Non Final Office Action dated Dec. 9, 2015", 10 pgs.

"U.S. Appl. No. 13/478,495, Notice of Allowance dated Apr. 6, 2016", 9 pgs.

"U.S. Appl. No. 13/478,495, Response filed Feb. 29, 2016 to Non Final Office Action dated Dec. 9, 2015", 6 pgs.

"U.S. Appl. No. 13/478,495, Response filed Jun. 2, 2015 to Restriction Requirement dated May 20, 2015", 7 pgs.

"U.S. Appl. No. 13/478,495, Restriction Requirement dated May 20, 2015", 7 pgs.

"U.S. Appl. No. 13/624,739, Examiner Interview Summary dated Sep. 21, 2015", 3 pgs.

"U.S. Appl. No. 13/624,739, Examiner Interview Summary dated Oct. 19, 2016", 3 pgs.

"U.S. Appl. No. 13/624,739, Examiner Interview Summary dated Dec. 29, 2014", 3 pgs.

"U.S. Appl. No. 13/624,739, Final Office Action dated Jul. 14, 2015", 32 pgs.

"U.S. Appl. No. 13/624,739, Non Final Office Action dated Jul. 12, 2016", 36 pgs.

"U.S. Appl. No. 13/624,739, Non Final Office Action dated Aug. 27, 2014", 16 pgs.

"U.S. Appl. No. 13/624,739, Notice of Allowance dated Feb. 3, 2017", 17 pgs.

"U.S. Appl. No. 13/624,739, Response filed Feb. 20, 2015 to Non Final Office Action dated Aug. 27, 2014", 18 pgs.

"U.S. Appl. No. 13/624,739, Response filed Oct. 11, 2016 to Non Final Office Action dated Jul. 12, 2016", 6 pgs.

"U.S. Appl. No. 13/624,739, Response filed Nov. 13, 2015 to Final Office Action dated Jul. 14, 2015", 19 pgs.

"U.S. Appl. No. 14/054,254, Examiner Interview Summary dated Apr. 4, 2016", 3 pgs.

"U.S. Appl. No. 14/054,254, Final Office Action dated Aug. 15, 2016", 11 pgs.

(56) References Cited

OTHER PUBLICATIONS

"U.S. Appl. No. 14/054,254, Non Final Office Action dated Dec. 31, 2015", 26 pgs.

"U.S. Appl. No. 14/054,254, Response filed Mar. 31, 2016 to Non Final Office Action dated Dec. 31, 2015", 20 pgs.

"U.S. Appl. No. 15/184,621, Examiner Interview Summary dated Dec. 8, 2017", 3 pgs.

"U.S. Appl. No. 15/184,621, Final Office Action dated Jan. 12, 2018", 6 pgs.

"U.S. Appl. No. 15/184,621, Non Final Office Action dated Sep. 7, 2017", 8 pgs.

"U.S. Appl. No. 15/184,621, Notice of Allowance dated Mar. 14, 2018", 9 pgs.

"U.S. Appl. No. 15/184,621, Response filed Feb. 6, 2018 to Final Office Action dated Jan. 12, 2018", 5 pgs.

"U.S. Appl. No. 15/184,621, Response filed Dec. 7, 2017 to Non Final Office Action dated Sep. 7, 2017", 7 pgs.

"International Application Serial No. PCT/US2012/039151, International Preliminary Report Patentability dated Dec. 5, 2013", 8 pgs.

"International Application Serial No. PCT/US2012/039151, International Search Report dated Jul. 19, 2012", 2 pgs.

"International Application Serial No. PCT/US2012/039151, Written Opinion dated Jul. 19, 2012", pgs.

Sadeghi, et al., "Token-Based Cloud Computing", Horst Gortz Institute for IT-Security, Ruhr-University, [Online]. Retrieved from the Internet: <http://syssec.rub.de/media/trust/veroeffentlichungen/2010/05/26/SSW10.pdf>, (May 26, 2010).

"U.S. Appl. No. 15/184,621, Notice of Allowance dated Jul. 6, 2018", 5 pgs.

* cited by examiner

SYSTEM AND METHOD FOR REAL-TIME COMMUNICATION BY USING A CLIENT APPLICATION COMMUNICATION PROTOCOL

CROSS-REFERENCE TO RELATED APPLICATIONS

This application is a continuation of U.S. patent application Ser. No. 14/054,254, filed 15 Oct. 2013, which is a continuation in part of U.S. patent application Ser. No. 13/624,739, filed 21 Sep. 2012, which claims the benefit of U.S. Provisional Application No. 61/537,217, filed 21 Sep. 2011, and this application is a continuation in part of U.S. patent application Ser. No. 13/478,495, filed 23 May 2012, which claims the benefit of U.S. Provisional Patent Application No. 61/489,189, filed on 23 May 2011 and U.S. Provisional Patent Application No. 61/500,549, filed on 23 Jun. 2011, which are all incorporated in their entirety by this reference.

TECHNICAL FIELD

This invention relates generally to the telephony field, and more specifically to a new and useful system and method for communication with a client application in the telephony field.

BACKGROUND

In recent years, telephony applications and Voice over Internet Protocol (VoIP) have found applications in numerous settings. Such technology has enabled clients to establish communication to outside devices such as phones or applications. However, the nature of most network configurations requires usage of a traditional mobile telephony or landline telephony platform. This seriously limits the type of applications of internet-based telephony. Additionally, real-time communication on the internet has become possible through numerous advancements. Such possibilities have in part been brought about by the browser support of real-time protocols. One such protocol is WebRTC, which provides javascript APIs for real-time communication capabilities in a web browser. One problem with real-time communication is that other real-time communication protocols are available and there is no ubiquitous solution. This limits the functionality available through the WebRTC protocol alone. Thus, there is a need in the telephony field to create a new and useful system and method for real time communication with a client application, such that the client can utilize an Internet browser and/or native application on a computer and/or mobile device for making and/or receiving real time communications. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Connecting a Client

Figure 1:
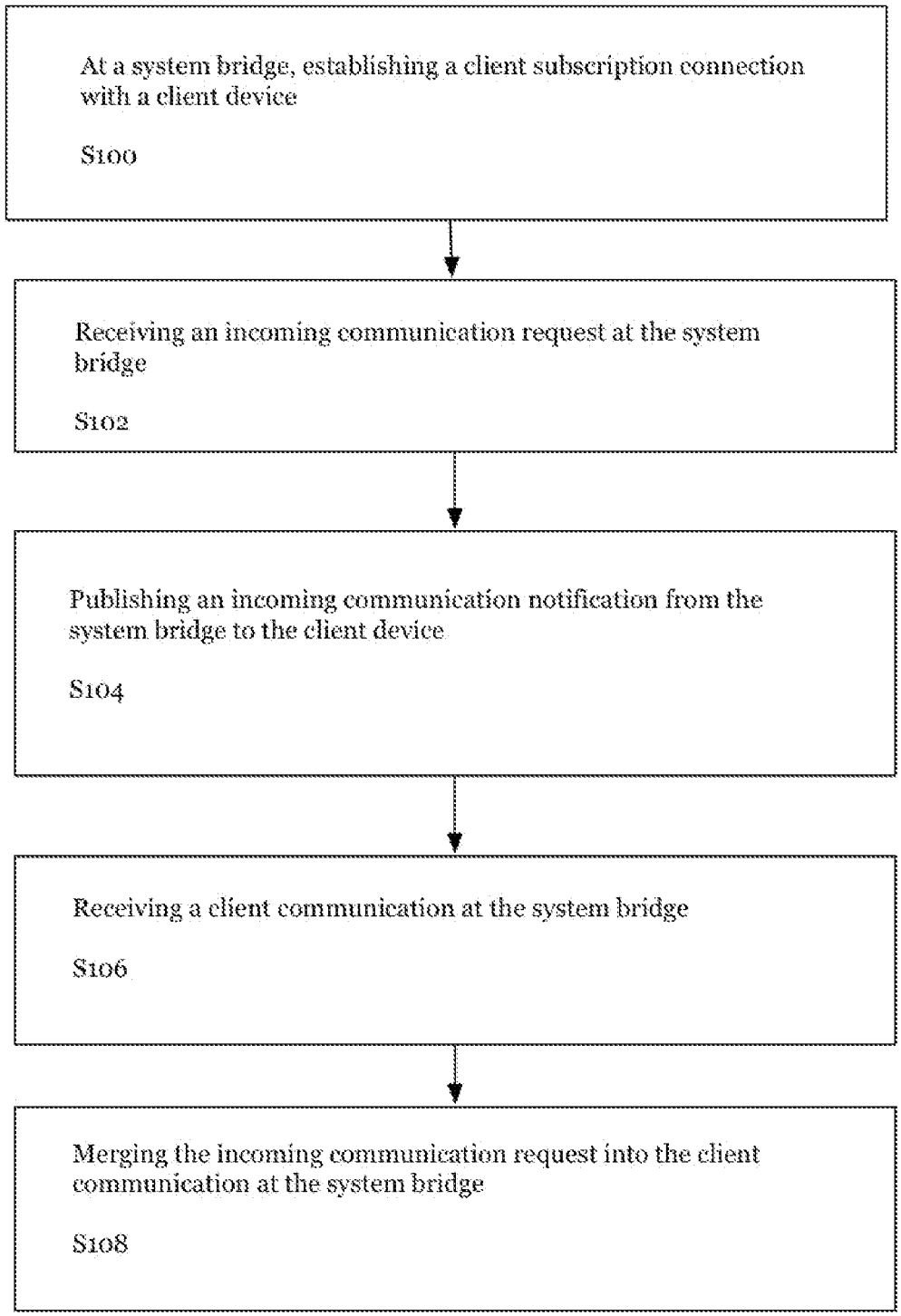
FIG. 1 is a flowchart depicting a first method for connecting a communication to a client in accordance with a preferred embodiment.
Figure 2:
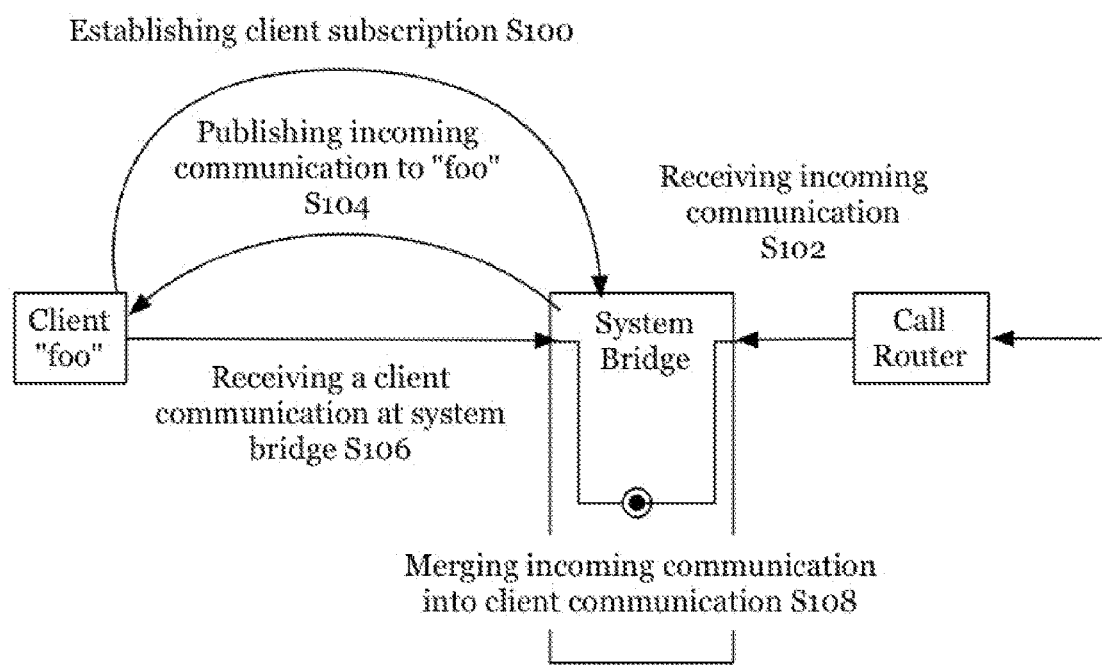
FIG. 2 is schematic representations of preferred method for connecting a communication to a client in accordance with a preferred embodiment.

As shown in FIGS. 1 and 2, a first preferred method for connecting a communication to a client of a preferred embodiment can include: at a system bridge, establishing a client subscription connection with a client device in block S100; receiving an incoming communication request at the system bridge in block S102; publishing an incoming communication notification from the system bridge to the client device in block S104; receiving a client communication at the system bridge in block S106; and merging the incoming communication request into the client communication at the system bridge in block S108. The first method preferably functions to connect incoming communications to a client utilizing a subscription connection that prompts a client to call out. The first method preferably creates a substantially persistent channel of communication such that a client can actively establish a connection when an incoming message arrives, which in turn preferably enables web services, mobile devices, and platforms that want to implement features for incoming communications to circumvent incoming communication issues caused by firewalls and routers. In one alternative implementation of the first preferred method, client communication is preferably initiated by a client as opposed to a client directly responding to a received incoming call. The client application can selectively utilize different real time protocol mechanisms to establish communication. The system bridge can bridge a client application (e.g., a native application or browser application) with a communication platform such as the telephony application platform described in published U.S. Patent Application No. 2009/0252159, titled "SYSTEM AND METHOD FOR PROCESSING TELEPHONY SESSIONS", which is incorporated in its entirety by this reference.

Preferably, the first preferred method can employ authentication and/or authorization security measures that function to secure the communication channels. An authentication layer preferably prevents malicious parties from posing as a client and/or incoming call. In one embodiment, an application (web or native) may facilitate the use of a token to authenticate a client connecting to an incoming call. The first preferred method is preferably used within internet-telephony platform, but may alternatively be used for any suitable applications such as Internet messaging or real-time applications that may need to establish an incoming communication channel. The method can be configured and/or adapted to function for any suitable type of communication, including telephony-based voice calls, Internet based voice calls, video calls, video streams, video sessions, screen sharing, screen sharing streams, screen sharing sessions, SMS messaging, IP messaging, alternative messaging, or any suitable form of communication. The term call should be understood to include any suitable application communication session, and any suitable form of incoming communication to a client may be received and merged with the client through this method, such as video, screen sharing, chat, or text messaging.

As shown in FIG. 1, the preferred method can include block S100, which recites at the system bridge, establishing a client subscription connection with a client device. Block S100 preferably functions to create a substantially persistent connection between the client and the system bridge. The client subscription connection is preferably a publication/subscription Internet communication channel that can be used to push incoming call notifications to the client. The client subscription can be used as a signaling channel between the client device and the system bridge. The system bridge can function as a signaling and media gateway that bridges client real time communication with that of a communication system or other endpoint. In one variation, the communication system will use an internal communication scheme with an internal signaling (e.g., SIP) and media (e.g., RTMP with a PCMU codec). The system bridge can manage interface of real time communication with various client applications and the internal communication of a communication platform. The subscription channel can include one or more websockets, an HTTP server push, an Adobe flash socket, ajax long polling, ajax multipart streaming, a forever iframe, jsonp polling, Comet, XMPP, BOSH, or any suitable communication technology to facilitate a client subscription. The subscription connection is preferably persistently maintained. The client preferably establishes a client subscription connection by initially registering a subscription channel and then subscribing to that channel. The channel is preferably subscribed to using a method substantially similar to method for connecting a client to an application described below where the use of a token is used. Alternatively, any suitable technique to subscribe may be used. Once registered, the system bridge will preferably publish a notification to that subscription. The subscription connection is preferably established between a client and a system bridge through a pubsub system, but any suitable subscription connection may be used. A client identifier is preferably created which may be used for the subscription channel but additionally as a handle or mapping for addressing incoming calls. The client identifier is preferably specified by the client, but may alternatively be an automatically assigned client identifier. The client identifier preferably includes a client ID, which may be signed with a shared secret. The client identifier may include various scopes that may take form as subdirectories or hierarchical layers of contexts. For example, one name space of "foo" may have a subdirectory of "foo/mobile" and a second subdirectory of "foo/web". In this example, "foo/mobile" may be registered for a mobile device client and "foo/web" may be registered for a desktop browser session. Incoming calls can preferably address these devices individually by using "foo/mobile" or "foo/web". Additionally, an incoming call may be simultaneously directed at both clients by using "foo/*". Additional attributes can be assigned to the name-spaced endpoint or to different scopes of the name-spaced endpoint. Additionally the client identifiers may be used to broadcast to multiple clients. Clients can preferably subscribe to client identifiers. For example a plurality of clients may subscribe to "foo" and each receive a request sent to "foo".

Block S102, which recites receiving an incoming communication request at the system bridge, functions to accept a communication from an outside entity (i.e., the caller) directed to a client. The incoming call may have any suitable source. A cloud-based communication router preferably initially receives/initiates the incoming communication. The cloud-based communication router is preferably a call router call router of a telephony platform such as one substantially similar to the one described in published U.S. Patent Application No. 2009/0252159, titled "SYSTEM AND METHOD FOR PROCESSING TELEPHONY SESSIONS", which is hereby incorporated in its entirety by this reference, but the cloud-based communication router may alternatively be any suitable communication router. Alternatively, the system bridge may be integrated into the cloud-based router or call router architecture or alternatively into any suitable communication framework. The incoming call preferably specifies an identifier, and more preferably, the incoming call specifies a name-spaced client identifier. The identifier preferably corresponds to a client or more preferably a subscription channel. In one variation, the client may vary depending on what user devices are active, and thus the identifier is preferably not specific to a particular client device (e.g., addressing to "foo/*"). The identifier is preferably unique to a user, account, session, or any suitable entity. Preferably using the identifier, a subscription is identified and an incoming communication notification is generated for publishing in block S104. While the client is notified and calls out, the system bridge preferably puts the incoming communication into a holding-state. The holding state is preferably a temporary state where the incoming communication is received by the system bridge but the client (e.g., the callee) has not initiated an outgoing communication to connect to the caller. When the system bridge is ready to merge the incoming communication to a client, the incoming communication is pulled from the holding-state.

In one variation, a service can facilitate identifying the signaling subscription of a client device. The identifier preferably includes an account identifier and a client identifier. The client identifier can be assigned to a device or automatically assigned. For example, if an outside developer designs a client application to establish a client real time communication connection, the developer could assign the connection an identifier that identifies that user within the developer's system (e.g., a username). A client device can maintain multiple signaling subscriptions and thus multiple client identifiers can refer to a single client device. Similarly, multiple client devices can share common client identifiers if multiple client devices want to maintain multiple communication endpoints in parallel. The signaling subscription identification service can accept the identifier and then can specify the appropriate system bridge or alternatively route the request to the appropriate system bridge. Client communication can be limited to within an account or a subaccount of the communication platform, but client communication can alternatively occur across different accounts if the identifier is generalized to enable inter-account client addressing. For example, the name space of client identifiers can be scoped by account/application identifiers. For example, "foo@client.app1.example.com" could be used to specify a client connection 'foo' made through app1 on the example.com communication platform.

Figure 3:
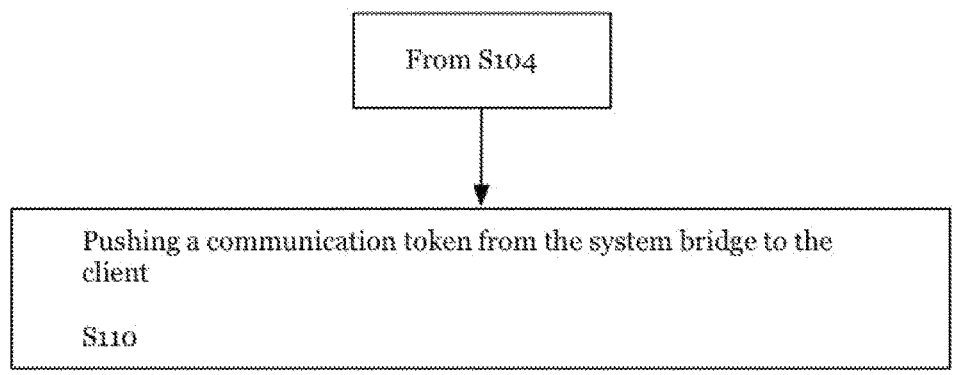
FIG. 3 is a flowchart depicting a variation of the first preferred method for connecting a communication to a client.
Figure 4:
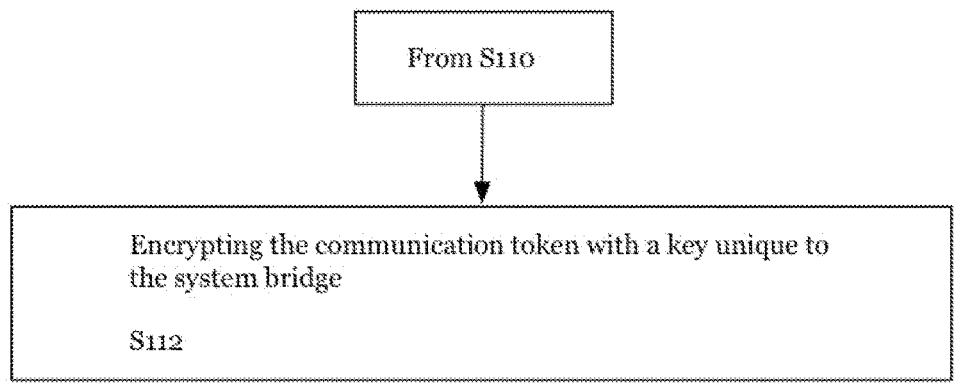
FIG. 4 is a flowchart depicting another variation of the first preferred method for connecting a communication to a client.
Figure 5:
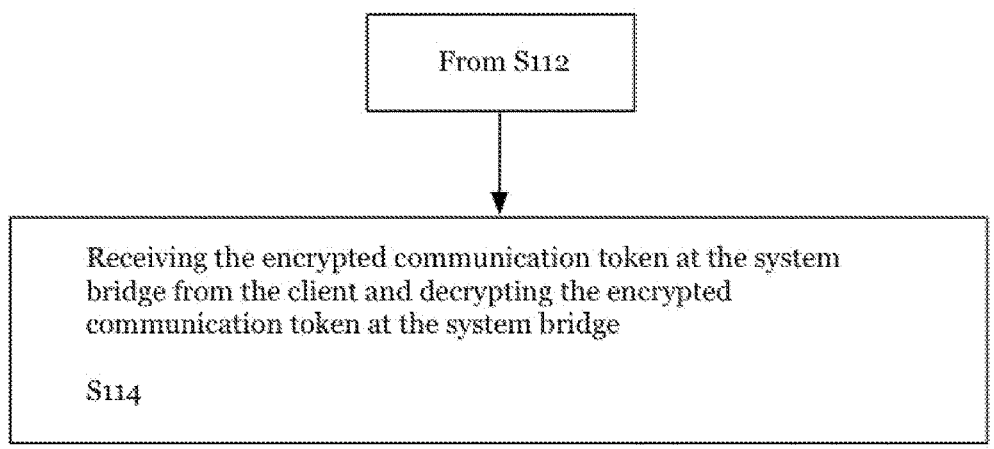
FIG. 5 is a flowchart depicting another variation of the first preferred method for connecting a communication to a client.
Figure 15:
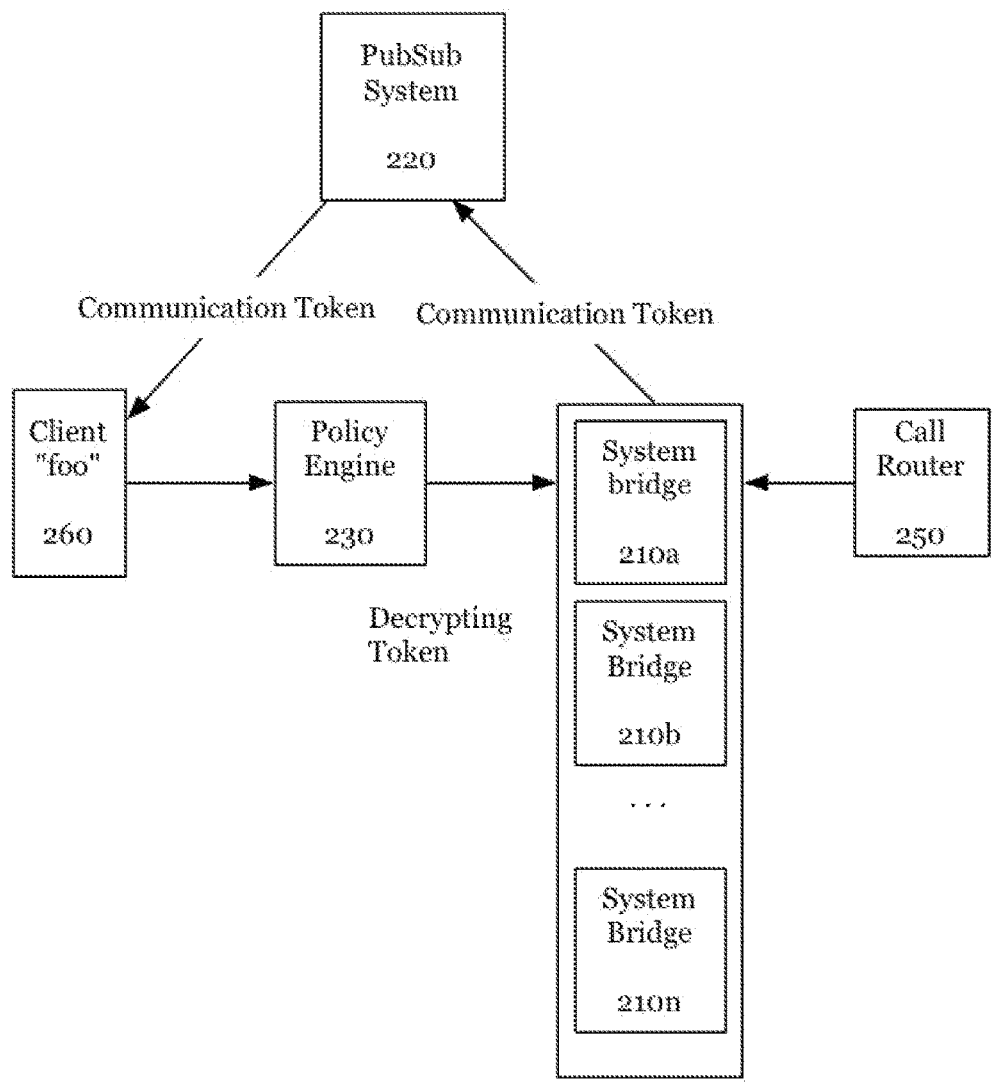
FIG. 15 is a schematic block diagram of another system for connecting a communication to a client in accordance with a preferred embodiment.

Block S104, which recites publishing an incoming communication notification from the system bridge to the client device, functions to push a message to the client through the subscription channel. The client subscription channel preferably facilitates simple notification because the connection is substantially persistent and the outside entity is not required to independently establish the connection. There may additionally be a plurality of clients subscribed to the subscription channel, and the incoming communication notification may be published to a plurality of clients. The incoming communication notification is preferably sufficient to initiate a client communication sent to the system bridge by the client. Alternatively, the communication notification may include additional parameters such as keys to authenticate the message is from the system bridge, call URI's to direct a call out, caller metadata, and/or any suitable parameter. The signaling communication from the system bridge can be any suitable form of signaling protocol. In one implementation, the signaling communication is made through a websocket and uses JSON or other data serialization format to approximate SIP or other suitable protocols used to control multimedia communication sessions. The system bridge may additionally pass opaque data (from the perspective of the client) to the client. This data is preferably passed along when the client connects back in. In one variation, block S104 may include pushing a communication token from the system bridge to the client S110 as shown in FIG. 3. The passed communication token may be used to later identify which incoming communication to connect with the client communication. The communication token preferably includes a communication ID and a host (identifier for the instance) that allows the incoming communication to be uniquely identified across multiple bridge nodes. Block S110 preferably includes encrypting the communication token with a key unique to the system bridge in block S112 and as shown in FIG. 4. The variation preferably includes receiving the encrypted communication token at the system bridge from the client and decrypting the encrypted communication token at the system bridge in Block S114 as shown in FIG. 5. The passing of a communication token functions to remove the need for an external state, unnecessary because the state is preferably contained in the system bridge token. As described below, the communication token is preferably passed back to the system bridge from the client, and the communication token is then decrypted with the bridge system secret and the call (or connection) bridged as shown in FIG. 15. When there is a plurality of system bridges used in a scale infrastructure, the token preferably indicates which system bridge to pass the client communication message. If the subscription channel is encrypted and authorized, then the token may additionally function to provide security for incoming connections.

Block S106, which recites receiving a client communication at the system bridge, functions to have the client call out to the system bridge to be merged with the incoming communication. The client, upon receiving the communication notification from block S104, preferably initiates forming connections to the system bridge. The client may be any suitable device with a network connection to the system bridge. The client device may be running a native application or alternatively a web application. The call out message is preferably communicated through HTTP or HTTPS but any suitable application transport layer may alternatively be used. Any additional parameters from the client are preferably included in a message to the system bridge as appropriate, such as an application identifier or application data. The application identifier is preferably a name-spaced endpoint. A name spaced endpoint is preferably a context that embodies various aspects for the endpoint (e.g., a client). Name-spaced endpoints preferably include a plurality of parameters including associated phone numbers, application URI's, status callback URI's (e.g., backup URI's if communication with a client application fails), or any suitable parameter. A name-spaced endpoint may be globally or locally unique for a given user. For example, a name-spaced endpoint may be unique for all communication occurring over a platform or protocol. The name-spaced endpoint may alternatively, be unique for an instance of an application. Allowed users, pricing models, account-application settings, and/or any suitable aspects can be stored as part of the name-spaced endpoint. For example, only particular users may be allowed to call in or use a particular scope of a name-spaced endpoint while a second scope may be publicly accessible.

Figure 6:
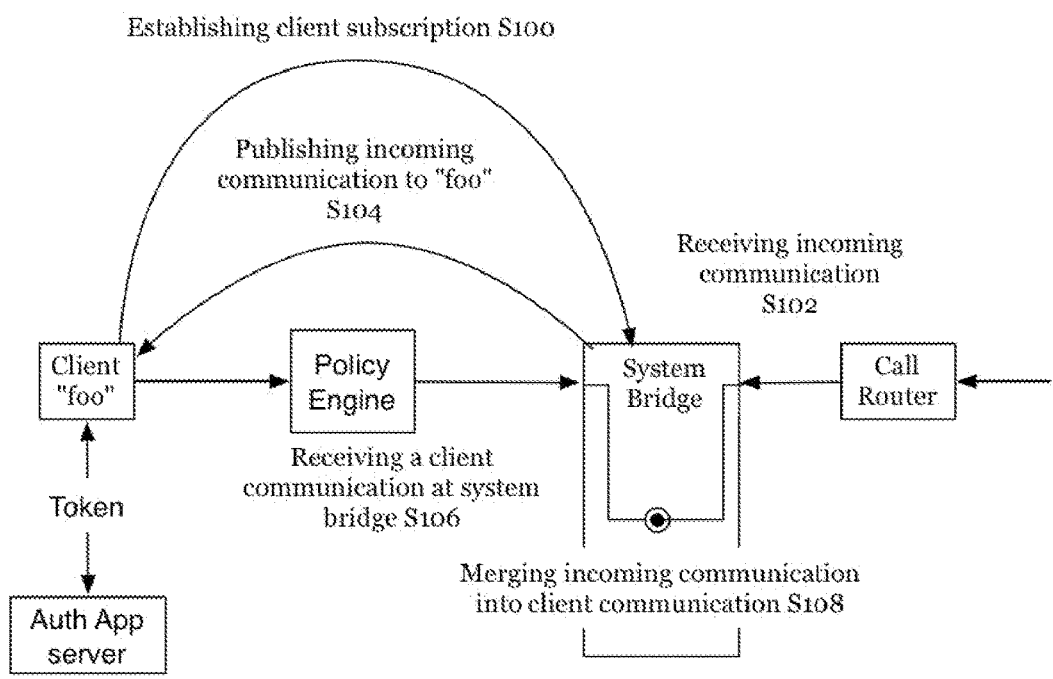
FIG. 6 is schematic representations of preferred methods for connecting a communication to a client in accordance with a preferred embodiment.
Figure 7:
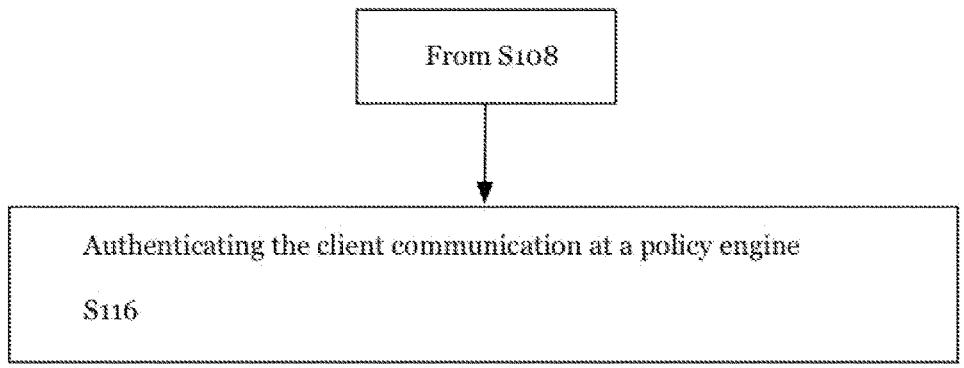
FIG. 7 is a flowchart depicting another variation of the first preferred method for connecting a communication to a client.
Figure 8:
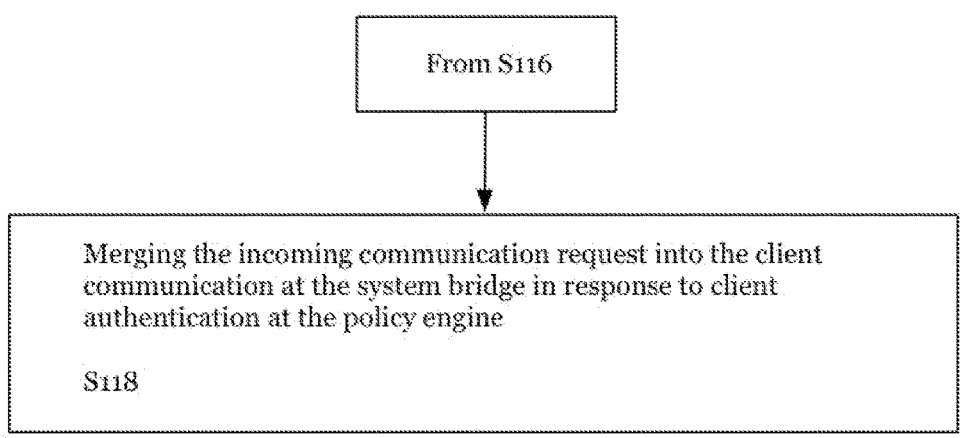
FIG. 8 is a flowchart depicting another variation of the first preferred method for connecting a communication to a client.

Additionally or alternatively, security measures are taken to authenticate the message from the client to the system bridge as shown in FIG. 6. Block S108 preferably includes authenticating the client communication at a policy engine S116 as shown in FIG. 7. The policy engine preferably authenticates a client communication from the client prior to merging the incoming communication. The policy engine preferably authenticated the client by using a token associated with the client and analyzing a signed client communication from the client. If the client communication satisfies the authentication, a preferred embodiment preferably includes merging the incoming communication request into the client communication at the system bridge in response to client authentication at the policy engine S118 as shown in FIG. 8. If the client communication fails to satisfy the authentication, an error may be logged and any suitable error response may be taken. Preferably, the token is sent from the client. In one variation, the client has an embedded token from when an application was instantiated. In another variation, a communication can be made to an authentication application to retrieve a token. Alternatively, a client identifier is sent to a policy engine that has an authentication application authenticate the credentials of the client identifier. Similarly a SIP backend authentication may alternatively be used. The authentication may occur for registration and/or outbound communications. The token preferably includes an application ID and any additional parameters. The contents of a token are preferably signed with a secret key. A policy engine preferably completes authentication of the token before allowing a connection to the system bridge. A policy engine preferably mediates the call out requests and authenticates any tokens, and may additionally verify permissions associated with application identifiers. Any suitable alternative forms of authentication may alternatively or additionally be integrated into the method.

Figure 22:
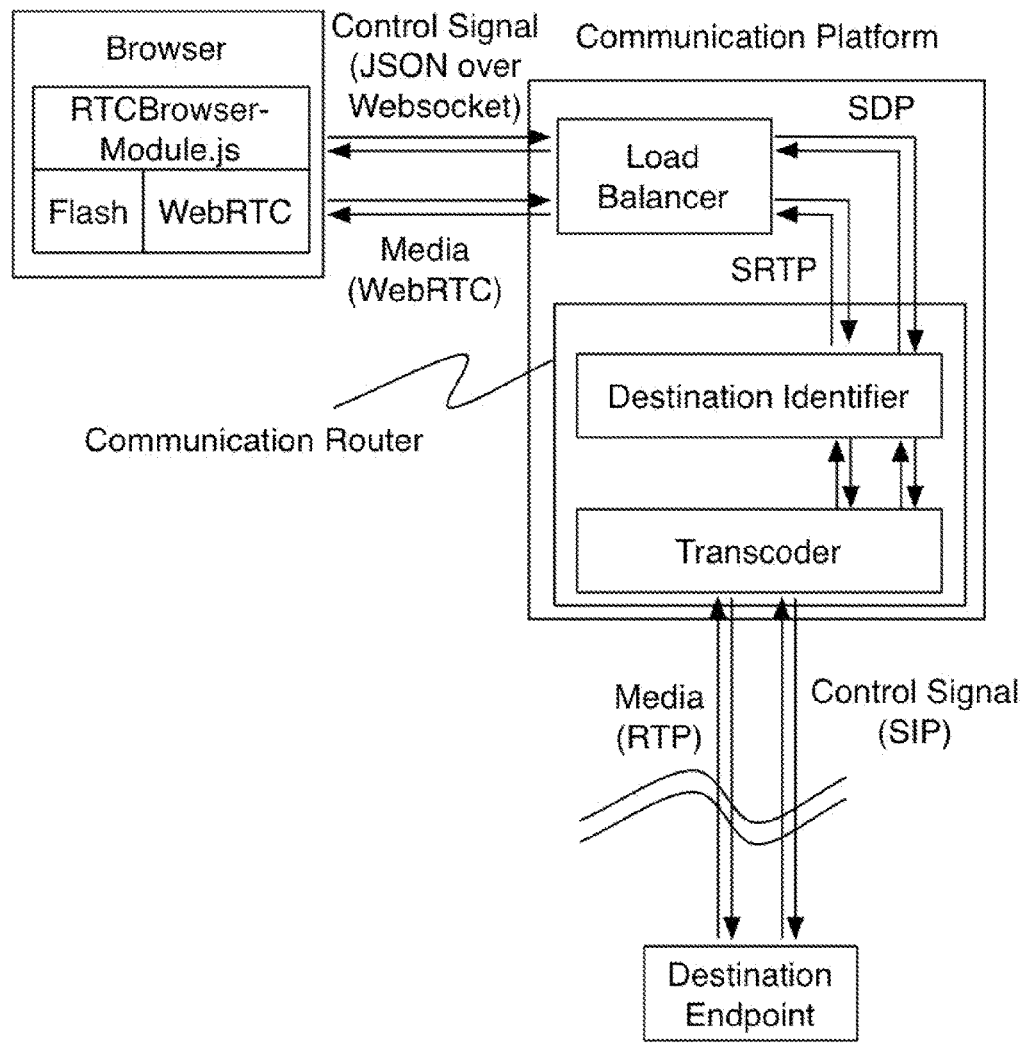
FIG. 22 is a schematic diagram of a system bridge acting as a gateway between different signaling and media channels.
Figure 23:
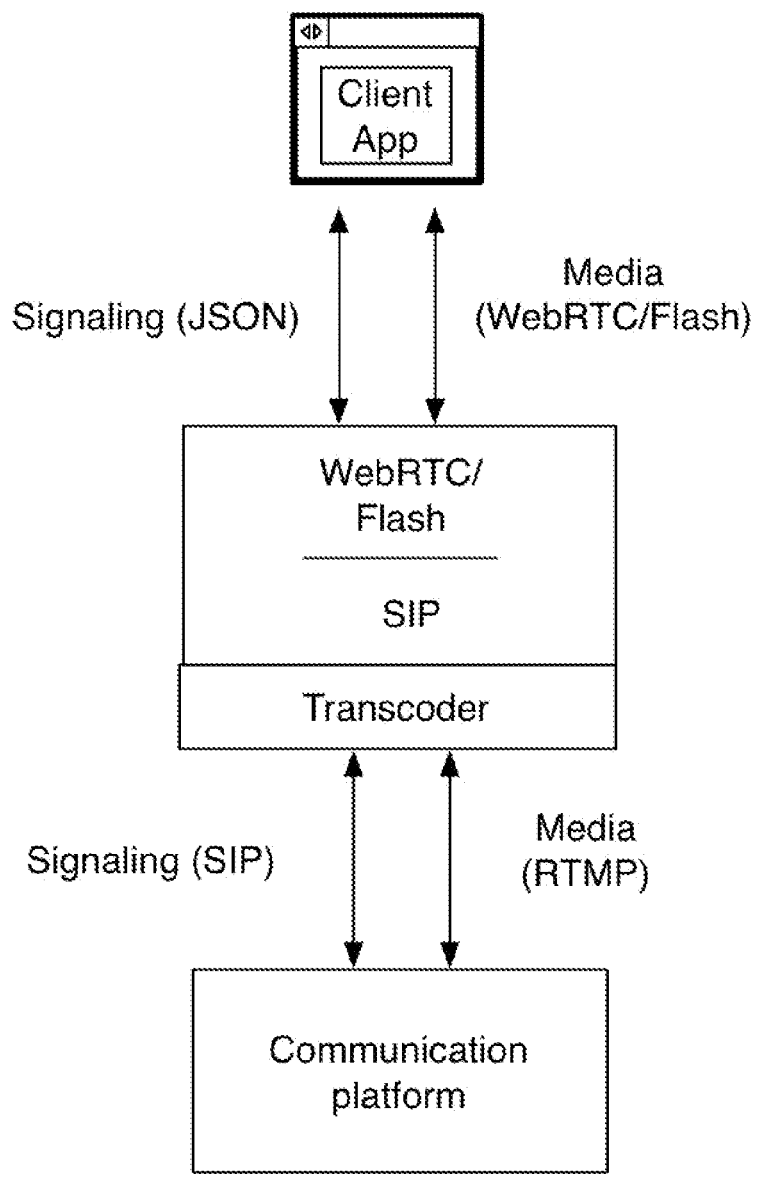
FIG. 23 is a schematic diagram of signaling and media channels merging between a client application and a communication platform.
Figure 24:
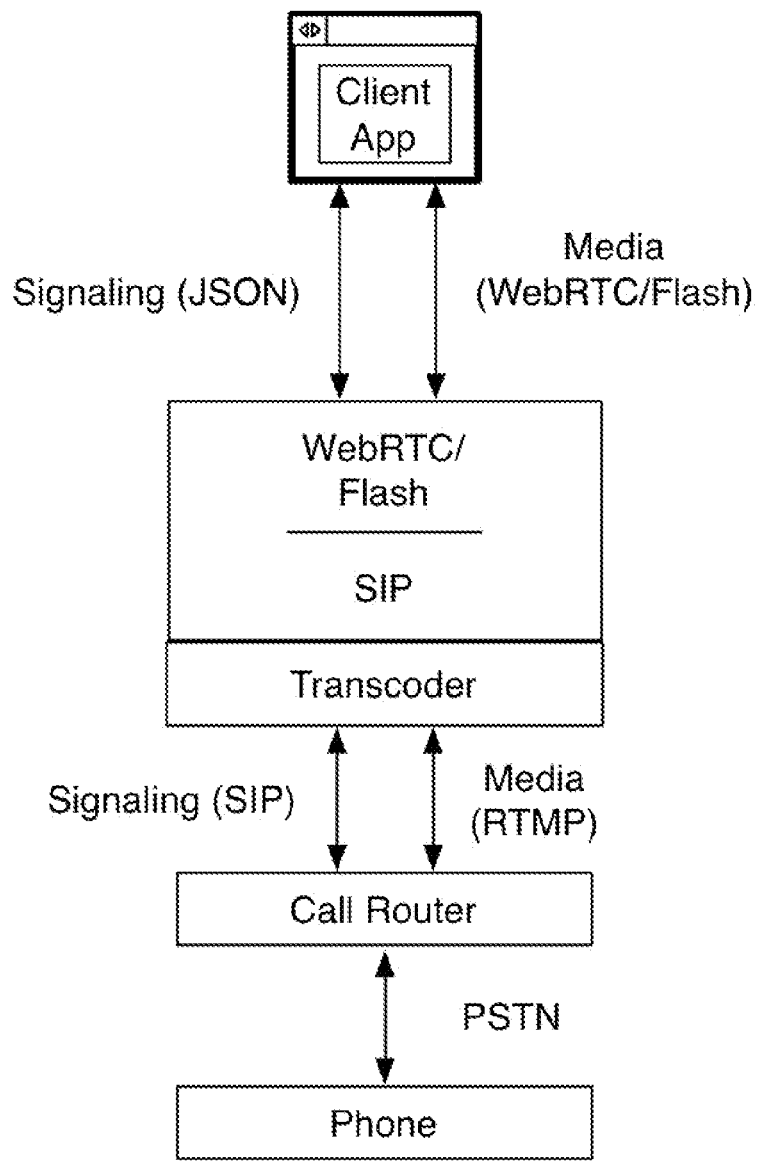
FIG. 24 is a schematic diagram of signaling and media channels merging between a client application and a PSTN phone.
Figure 25:
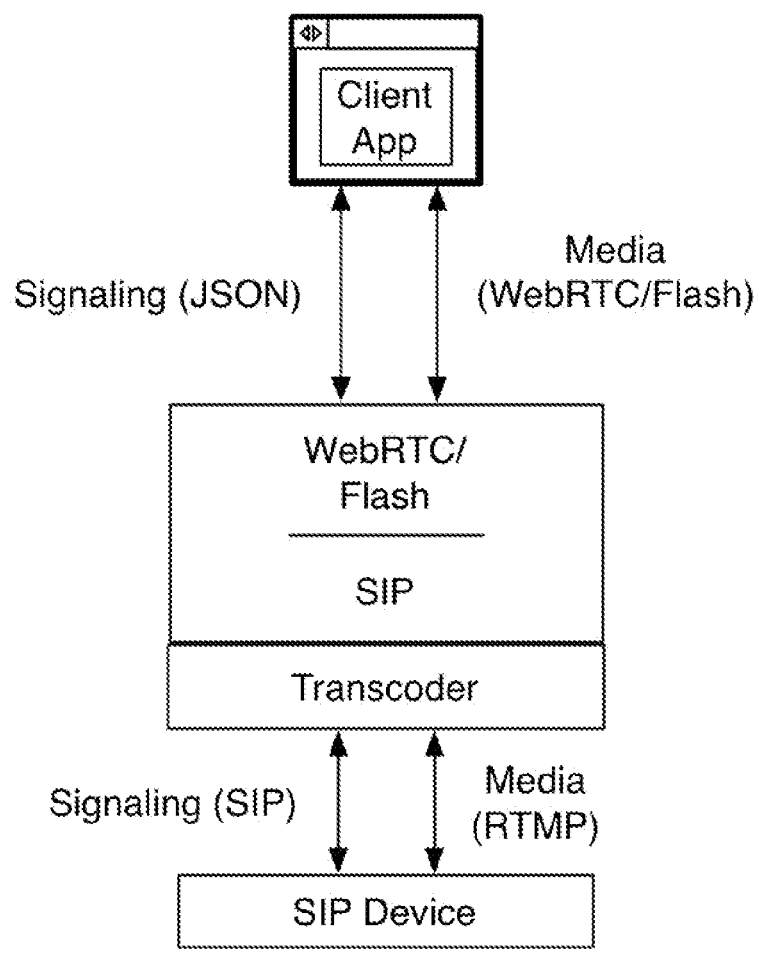
FIG. 25 is a schematic diagram of signaling and media channels merging between a client application and a SIP device.

Block S108, which recites merging the incoming communication request into the client communication at the system bridge, functions to connect the incoming communication request to the client. Once the client sends a client communication to the system bridge, the system bridge preferably identifies the corresponding incoming communication and establishes the communication channel between the client and the outside entity of the incoming communication. The incoming communication is preferably moved out of the holding-state and added to an active channel of communication with the intended client. Upon establishing the connection, the client and the outside entity can preferably continue to use the established connection for communication. For example, a VoIP call made to the system bridge may be connected to a client device, and then a VoIP session can preferably continue to use the channel established by the preferred method. The connection may be any suitable form of connection including a number of channels that may include audio, video, messaging, screen sharing, or any suitable channel for communication. Merging the incoming communication into the client communication at the system bridge can additionally include merging, bridging, or connecting a first real time media communication channel (i.e., the client device to system bridge leg) and a second real time media communication channel (i.e., system bridge to outside communication system leg), which can function to support multiple real time protocols. The first and second legs can be of different types of media communication channels. In an implementation where the client device is operating through a web browser, the real time media communication may include WebRTC, Flash, and/or any suitable mechanism. The outside communication system could be a communication platform as described above using another media communication approach such as using SIP. Merging the first and second real time media communication channels can include transcoding media between the first and second media communication channels as shown in FIG. 22. Various codecs may be used in different legs of the media channels. The transcoding preferably converts media to a codec appropriate for the destination channel. For example, an opus codec could be used over WebRTC and PCMU used within a communication platform. A transcoding service converts between the opus and PCMU for the two legs of the media communication channel. Additionally, the method can include translating between the client signaling and the destination signaling. The client signaling connection is preferably translated into corresponding signaling instructions in the signaling communication channel between the system bridge and the destination (e.g., telephony device, communication device, other client application instance). In implementation, merging can connect a client application with a communication platform or other communication infrastructure as shown in FIG. 23, with a PSTN device as shown in FIG. 24, a SIP based device as shown in FIG. 25, another client application, or any suitable destination endpoint.

Figure 9:
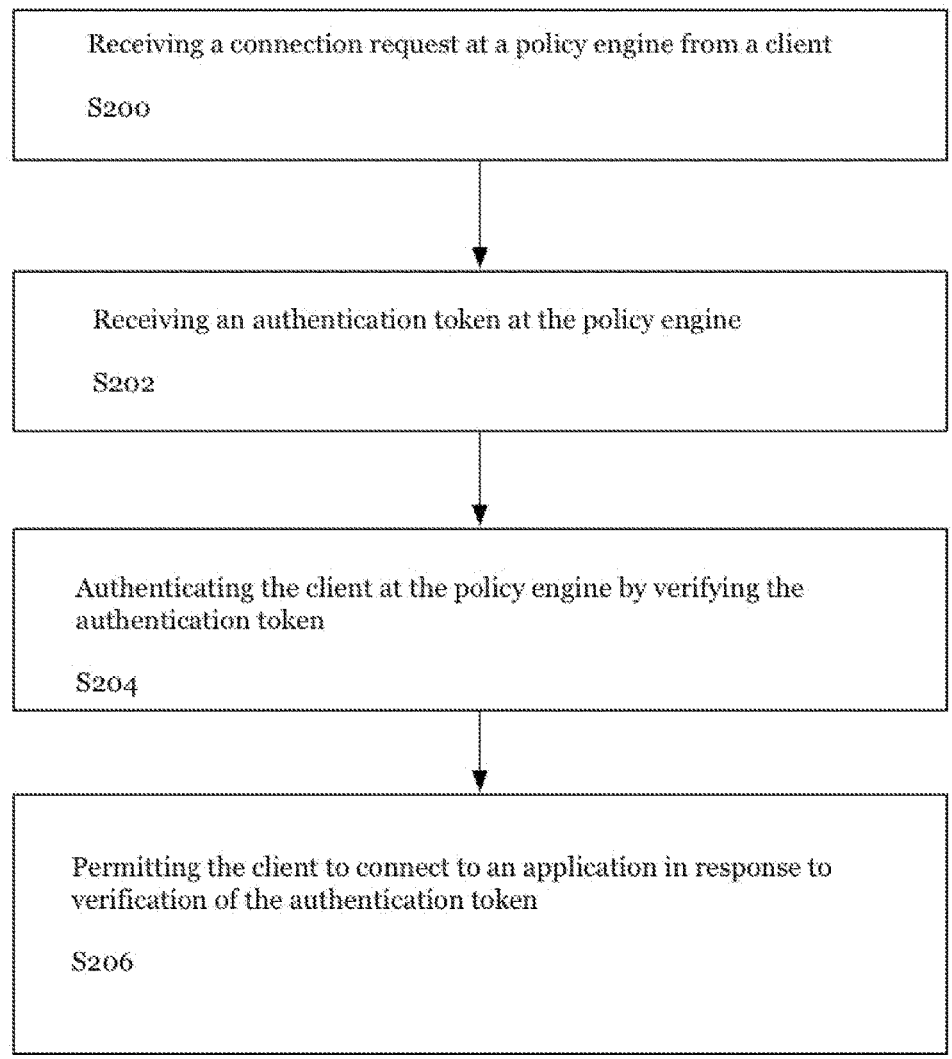
FIG. 9 is a flowchart depicting a second method for connecting a communication to a client in accordance with a preferred embodiment.

As shown in FIG. 9, a second preferred method for connecting a client to an application of a preferred embodiment includes receiving a connection request at a policy engine from a client, the connection request including an authentication token retrieved by the client in block S200; receiving an authentication token at the policy engine S202; authenticating the client at the policy engine by verifying the authentication token in block S204; and permitting the client to connect to an application in response to verification of the authentication token in block S206. The method functions to enable a possibly untrusted client to securely access application services and resources. A client preferably describes a web browser, application session, or any suitable outside entity. The method is preferably implemented for use with a telephony platform but may alternatively be used for any suitable communication platform. The method may be used to implement browser based telephony application such as click to call features, voice sessions, video calls, video streams, screen sharing, sending of SMS messages, alternative messaging, or any suitable application. In an exemplary application, the client is enabled to initiate and interact with a telephony application by obtaining a token to authenticate access to the application. Additionally, the method of connecting a client to an application may be applied in cooperation with the method above for a client receiving incoming communications.

Figure 10:
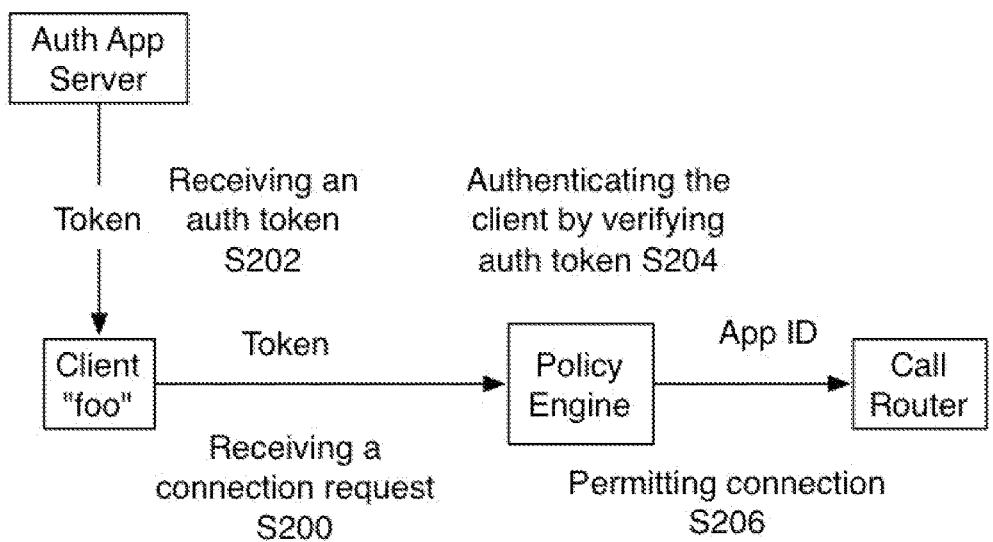
FIG. 10 is a schematic representation depicting a variation of the second preferred method for connecting a communication a communication to a client.
Figure 11:
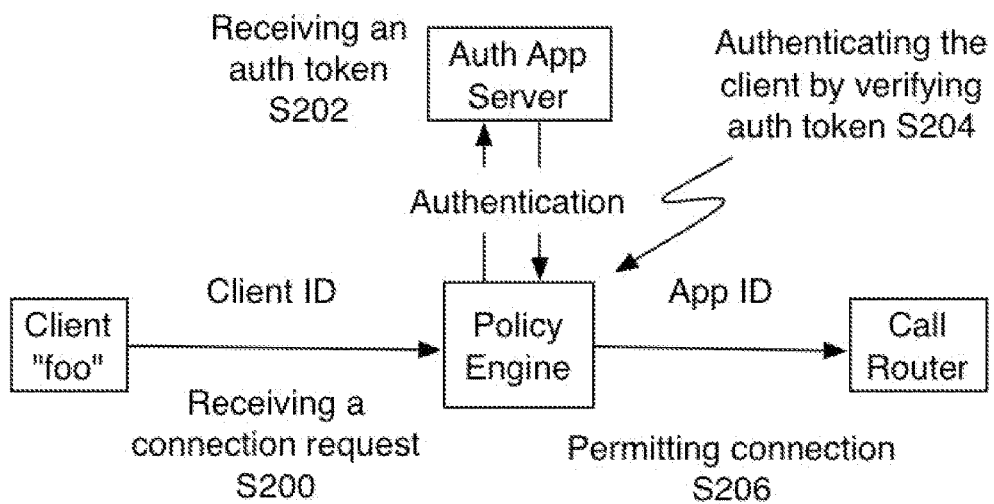
FIG. 11 is a schematic representation depicting another variation of the second preferred method for connecting a communication a communication to a client.

Block S200, which recites receiving a connection request at a policy engine from a client, functions to receive communication from a client wishing to use an application or make a communication. As described below, an authentication token is preferably directly or indirectly communicated to the policy engine. The policy engine then can preferably allow or deny access to an application by a client based on the verification of the authentication token. The connection request may be accompanied by the token as shown in FIG. 10 or the connection request may come prior to obtaining a token as shown in FIG. 11. The client application preferably uses establishes a signaling communication channel if the connection request is accepted. The signaling communication channel can be used to control a media communication channel over which synchronous communication flows.

Figure 12:
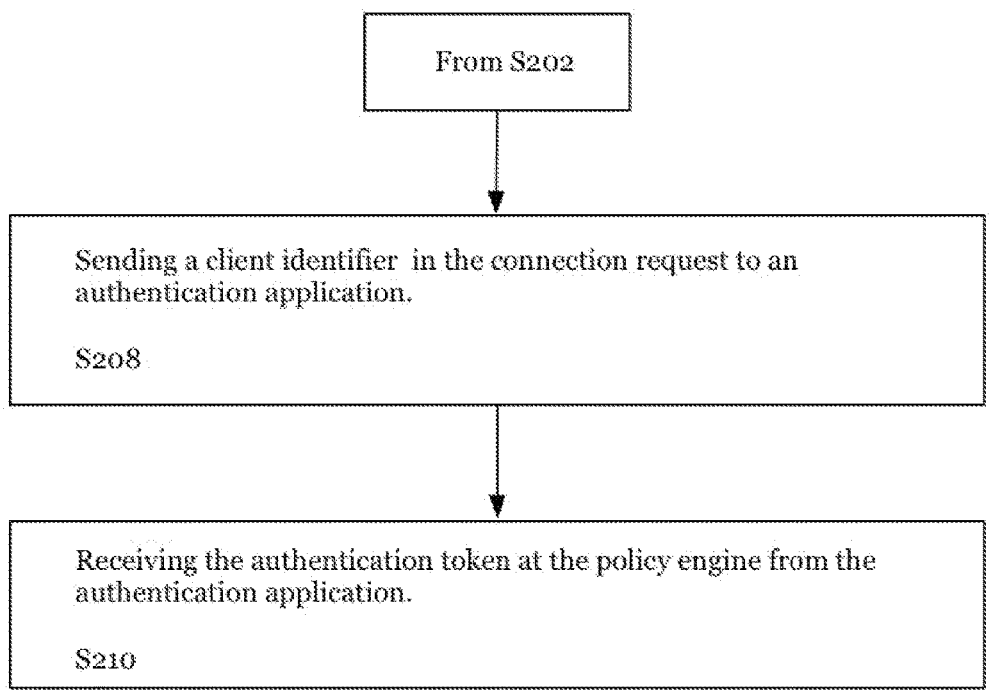
FIG. 12 is a is a flowchart depicting a variation of the second preferred method for connecting a communication to a client.

Block S202, which recites receiving an authentication token at the policy engine, functions to obtain an authentication token on behalf of a client. The authentication token is preferably a data package that includes application ID and/or additionally parameters. The authentication token is preferably signed. The authentication token is more preferably signed with a secret key shared by the policy engine and an accessing entity (e.g., a web application for use of the telephony application). The application ID and/or the authentication token may be sent to client, which may then use the authentication token to connect to a web application. In another variation, the client may provide an identifier that enables a policy engine to validate with an authentication application. In the first variation, as shown in FIG. 10, a web application preferably sends an authentication token to the client. The client then communicates the authentication token directly when sending a connection request. The authentication token may be embedded in the webpage or application when instantiated. Alternatively, a client may dynamically request the authentication token such as by using AJAX upon a user-triggered event. In a second variation, as shown in FIG. 11, the client may send an identifier when sending a connection request for indirectly obtaining a token for a client. In this variation, block S202 preferably includes sending a client identifier contained in the connection request from the client to an authentication application S208 and receiving the authentication token at the policy engine from the authentication application S210 as shown in FIG. 12. A policy engine preferably connects with an authentication application. The authentication application can preferably use the identifier to authenticate or deny access by the client. The authentication application then sends a response to the policy engine preferably includes an authentication token. The authentication token received at the policy engine from the authentication application preferably enables the client to be indirectly authorized to form a connection. The authentication application is preferably a server run by the web application entity, but may alternatively be a third party authentication application. The identifier may include an account name, code, or any suitable parameters that the authentication application requires to complete authentication.

Block S204, which recites authenticating the client at the policy engine by verifying the authentication token, functions to determine if a client should be allowed or denied access to an application. In the first variation where a token is received from the client, a shared secret between the application and the policy engine may be used to authenticate the token. In the second variation, the authentication application may send the authentication token, which may be authorized in a similar manner, or the authentication application may communicate to the policy engine if the client is allowed or denied.

Figure 13:
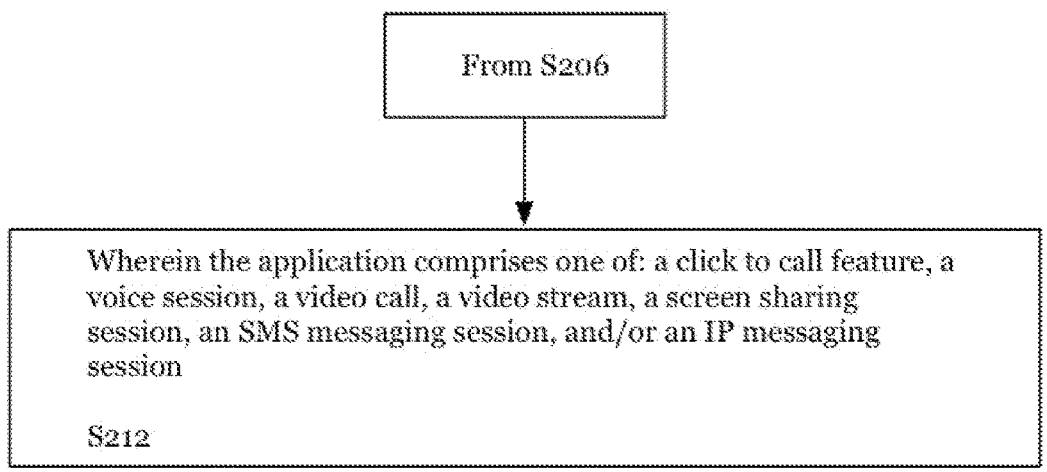
FIG. 13 is a is a flowchart depicting another variation of the second preferred method for connecting a communication to a client.

Block S206, which includes permitting the client to connect to an application in response to verification of the authentication token, functions to allow the client to connect to the application or to deny the client access to the application. The connection request from the client is preferably forwarded on to the application if the verification of the authentication token allows access. If the connection request is denied, a communication may be sent back to the client or any suitable response may be made. The connection in one application is preferably establishing a voice session, video session, click to call feature, starting an outbound call, a video stream, a screen sharing session, SMS/MMS messaging, IP messaging session, and/or any suitable communication application as in block S212 shown in FIG. 13. In one exemplary application, a call router of a telephony platform preferably facilitates execution of the application.

2. System for Connecting a Client

Figure 14:
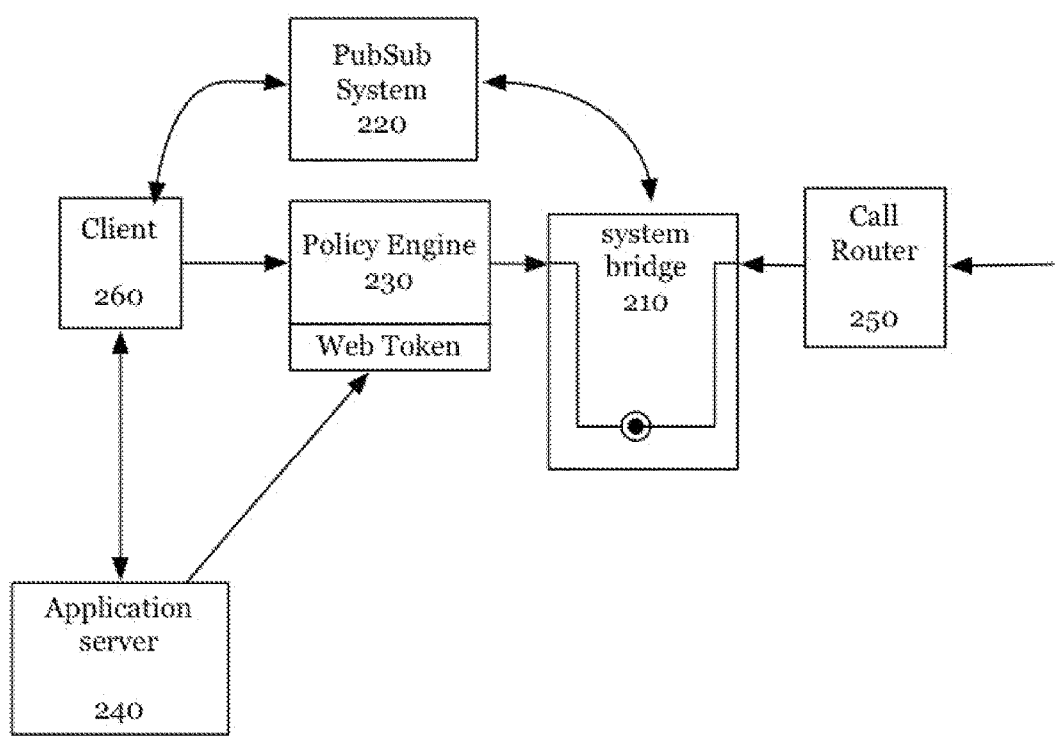
FIG. 14 is a schematic block diagram of a system for connecting a communication to a client in accordance with a preferred embodiment.

As shown in FIG. 14, a system for connecting a call to a client of a preferred embodiment preferably includes a system bridge 210, a pub/sub system 220, and optionally a policy engine 230. The system preferably functions to facilitate connecting an outside entity to a client 260. The system preferably implements the above method. The system bridge 210 preferably includes an incoming channel to receive incoming calls or video such as from a PSTN device, another client device, or any suitable source. In one embodiment, the system bridge 210 includes a communication link to a call router 250 of a telephony platform. In another embodiment, the system bridge 210 is integrated into a call router 250. In another implementation, a SIP endpoint is used in place of a call router. As shown in FIG. 15, the system bridge 210 may be a cloud environment or system bridge cluster composed of a plurality of system bridges (210a, 210b, 210n). The system bridge 210 preferably additionally includes internet channels to be accessed by a client 260. The system bridge 210 preferably connects to the pub/sub system 220, and the pub/sub system 220 preferably maintains persistent connections to clients. The pub/sub system 220 may use any suitable technology such as websockets, HTTP server push, adobe flash sockets, AJAX long polling, AJAX multipart streaming, forever iframes, jsonp polling, Comet, XMPP, BOSH, or any suitable communication technology to facilitate subscription and publication channels. Any suitable system may be used in place of the pub/sub system such as a queuing system. The client 260 preferably includes native or web application code that cooperates with the system to establish a subscription through the pub/sub system 220 to the system bridge 210 and to send a client communication that is received by the system bridge 210. The client preferably uses HTTP or HTTPS or any suitable communication protocol. Additionally, a policy engine 230 may be an intermediary system for the communication channel between clients and the system bridge 210. The policy engine 230 preferably authenticates signed messages using web tokens, but may alternatively be configured for any suitable form of authentication. An authentication application server 240 preferably facilitates the distribution and/or processing of authentication tokens.

The system preferably implements the above methods in a computer-readable medium storing computer-readable instructions. The instructions are preferably executed by computer-executable components preferably integrated with the system bridge 210, the pub/sub system 220, and the optional policy engine 230. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

3. System for Communicating with a Client Application

Figure 16:
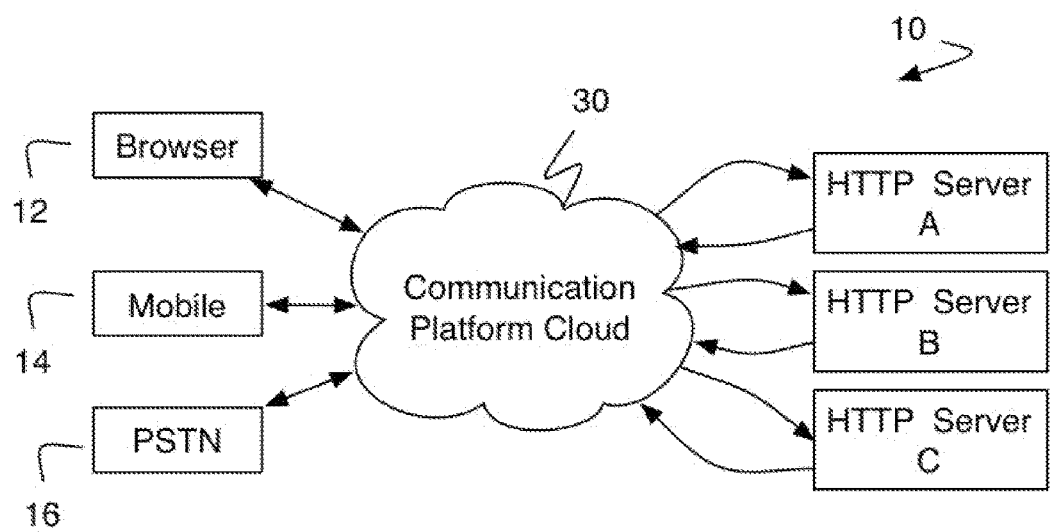
FIG. 16 a schematic block diagram of a system for connecting a call in accordance with a preferred embodiment of the present invention.

As shown in FIG. 16, a system 10 for communicating with a client application can include one or more hardware interfaces, including for example a browser 12, a mobile device 14, or a public switched telephone network (PSTN) line 16. In the system 10 of the preferred embodiment, each of the hardware interfaces 12, 14, 16 can be connected and/or interconnected with one another through a communication platform cloud-based service 30 such as that available from the assignee of the present application. Preferably, the cloud service 30 is configured according to an Application Programming Interface (API). As used herein, the term API should be understood to mean any combination of software, firmware, and/or hardware that allows two or more software applications (i.e., machine-readable instructions) to communicate with one another. An example API can be configured as a telephony platform such as one substantially similar to the one described in published U.S. Patent Application No. 2009/0252159, titled "SYSTEM AND METHOD FOR PROCESSING TELEPHONY SESSIONS", assigned to the assignee of the present application, and hereby incorporated in its entirety by this reference.

As shown in FIG. 16, the cloud system 30 functions to communicate with one or more client HTTP servers 18, 20, 22. The cloud system 30 and HTTP server 18, 20, 22 communications are preferably RESTful in nature in both directions. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. Hardware communications elements such as routers and servers preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data can include an updated representation of the call resource, or other call state data generated as a result of call router operation, such as digits pressed on the keypad or audio recordings generated.

State information included with each request can include a unique call identifier, call status data such as whether the call is in-progress or completed, the caller ID of the caller, the phone number called, geographic data about the callers, and/or any suitable data. Alternatively, a varying level of a RESTful communication (statelessness) can be used, such as by using cookies, session tracking, or any suitable devices to simulate a normal website visitor model. Preferably, data sent with each request can fully enable the application server to determine the next state of the call to execute. RESTfulness preferably does not preclude using an external data source, such as a database, to lookup additional data to log call meta data, or determine application logic.

The hardware interfaces 12, 14, 16 function to interface with the human element of the communication through voice, video, short message service (SMS), multimedia messaging service (MMS), proprietary or alternative IP messaging protocols, or other communication means and/or protocols. As an example, the browser 12 can include any web-enabled browser that is capable of receiving and/or transmitting voice signals such as through real time messaging protocol (RTMP) or other suitable TCP-type communication protocols. Some web browsers can use flash based real time communication channels. Other web browsers can use WebRTC communication channels. A client application can selectively decide which type of real time communication protocol is preferred/available for a given communication. Alternatively, the browser 12 can include any plug-in enabled browser that is configured for session initiated protocol (SIP) or other signaling communications that can be transmitted through TCP, UDP and/or other suitable protocols. Similarly, the mobile device 14 can include a SIP module or other suitable communication protocol. Preferably, each of the browser 12 and the mobile device 14 can be connected and/or connectable to the cloud service 30 through any suitable type of network, including but not limited to, wide area networks, local area networks, mobile telephony networks, or any suitable combination thereof. As an example, many current mobile devices 14, such as tablet computers, are connectable to the Internet through both WiFi and mobile telephony (GSM and CDMA) networks.

Figure 17:
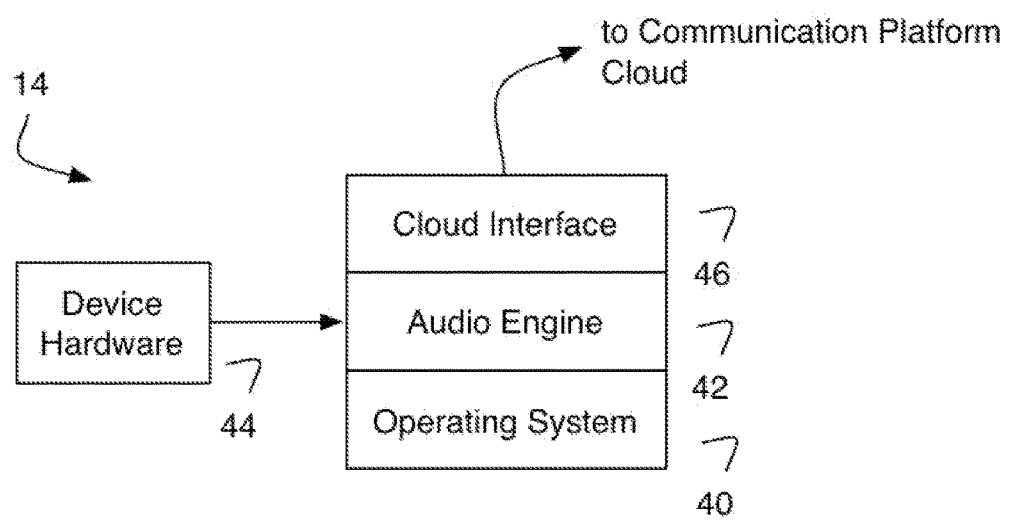
FIG. 17 is a schematic block diagram of a mobile architecture operable in the system for connecting a call of the preferred embodiment of the present invention.

The mobile device 14 of the system 10 of the preferred embodiment can include a series of modules relating to its communication function. As shown in FIG. 17, the mobile device 14 of the preferred embodiment can include an operating system module 40, an audio engine 42, and a cloud interface module 46. The operating system module 40 of the mobile device 14 of the preferred embodiment functions to control the general functionality of the mobile device 14, including but not limited to its communication capabilities. The audio engine 42 of the mobile device 14 of the preferred embodiment functions to control a majority of voice communication functions, including interfacing with any device hardware 44 such as speakers and microphones. In particular, the audio engine 42 can function to initiate and control communication sessions including voice communication sessions using Internet protocol (rather than a typical telephony communication protocol typically used in a mobile device).

The mobile device 14 of the preferred embodiment can further include a cloud interface module 46 that functions to cooperate with the audio engine 42 to communicate with the cloud service 30 and communicate with other hardware interfaces 12, 14, 16. The cloud interface module 46 can be configured within a browser function of the mobile device 14, or alternatively as a native application or set of machine executable instructions residing permanently or quasi-permanently in a memory module (not shown) of the mobile device 14. Preferably, the cloud interface module 46 can be designed according to the RESTful principles described above.

In one variation of the mobile device 14 of the preferred embodiment, the cloud interface module 46 can further include one or more security and/or resource management tools described in further detail below. Examples of security and/or resource management tools can include an authorization token, which can be defined as an electronic listing of possible privileges for its bearer. A developer or other suitable account holder preferably obtains an account token from the provider of the cloud service 30 and then signs the account token to generate an authorization token. The authorization token can be used to authorize actions when included in communication requests, client registration, client presence registration, and/or any suitable use. The cloud service or any suitable service can preferably verify the authorization token by validating the signature of the authorization token against the account key. Thus enabling possibly untrusted client applications to prove that they are authorized to perform particular actions. Example privileges conferred by a token can include, but are not limited to, a user's abilities to make and/or receive calls, an identification of the application and/or user, and one or more operational parameters that can further define a scope of functions and/or processes performable by the cloud interface module 46. In one exemplary variation, an authorization token permits a communication request to send one or more communications. In another exemplary variation, an authorization token can permit a communication request to establish a communication session that supports communications selected from audio, video, chat, and/or other suitable communication mediums. In another variation an authorization token can permit presence information to be provided to other devices or to be obtained from other devices or a contact list. In one alternative embodiment, the token can be transmittable in its entirety in the clear. In another alternative embodiment, some or all aspects of the token are encrypted during transmission and are partially or entirely unknown to the user of the mobile device 14. The cloud service 30 may be substantially agnostic relative to the contents of the token insofar as the contents of the token can be directed entirely to the HTTP server or to a authorization server indicating if the authorization token is allowed. Alternatively, the cloud service 30 can function in part as a gatekeeper and perform one or more security and/or authenticity checks prior to, during, and/or following a communication session.

The system preferably implements the methods described herein in a computer-readable medium storing computer-readable instructions. The instructions are preferably executed by computer-executable components preferably integrated with the mobile devices 12, 14, 16, the cloud system 30, and the HTTP servers 18, 20, 22. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

4. Method for Connecting a Call to a Client

Figure 18:
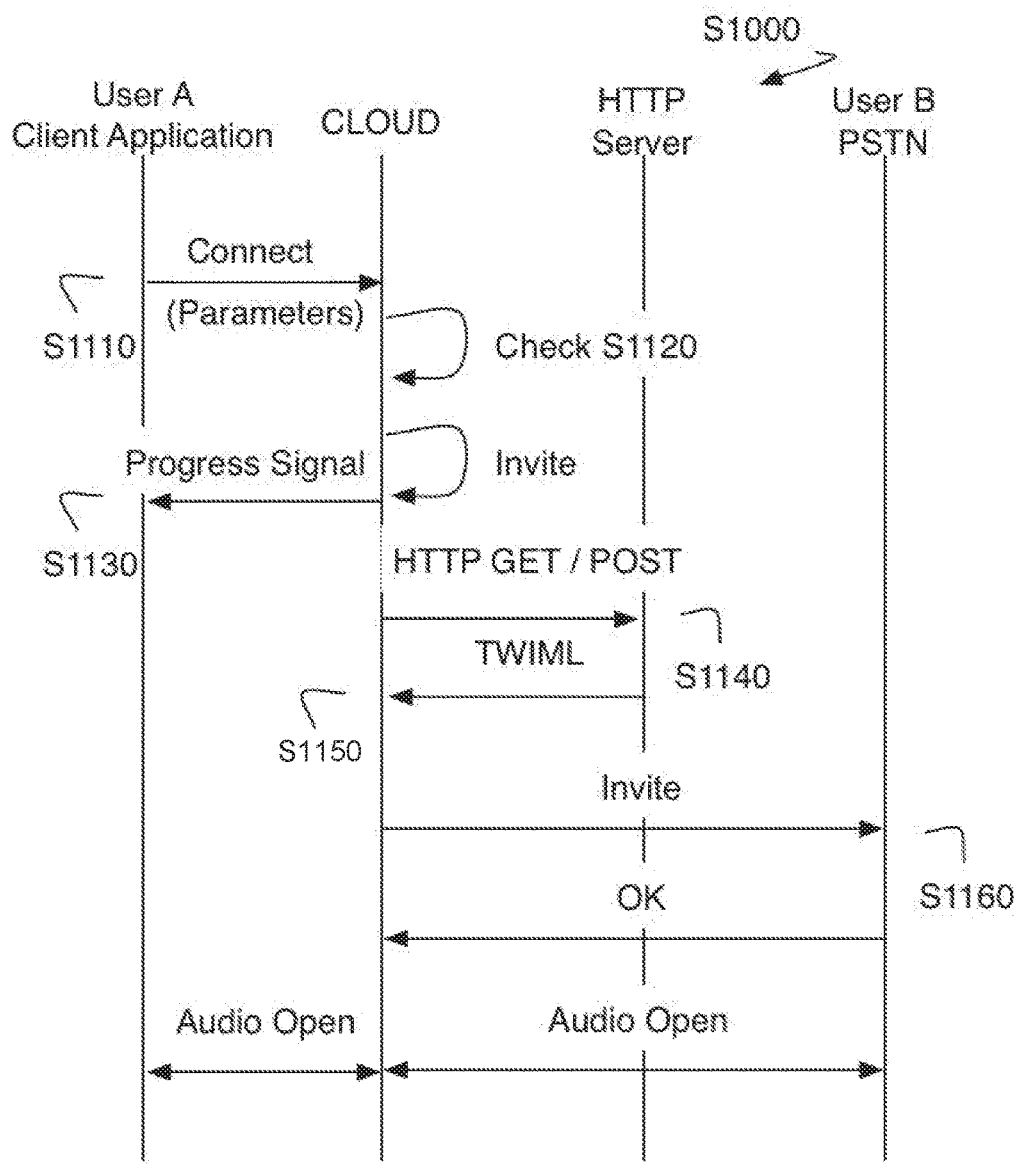
FIG. 18 is a schematic diagram of a method for making an outgoing media channel communication from a client application in accordance with a preferred embodiment of the present invention.
Figure 19:
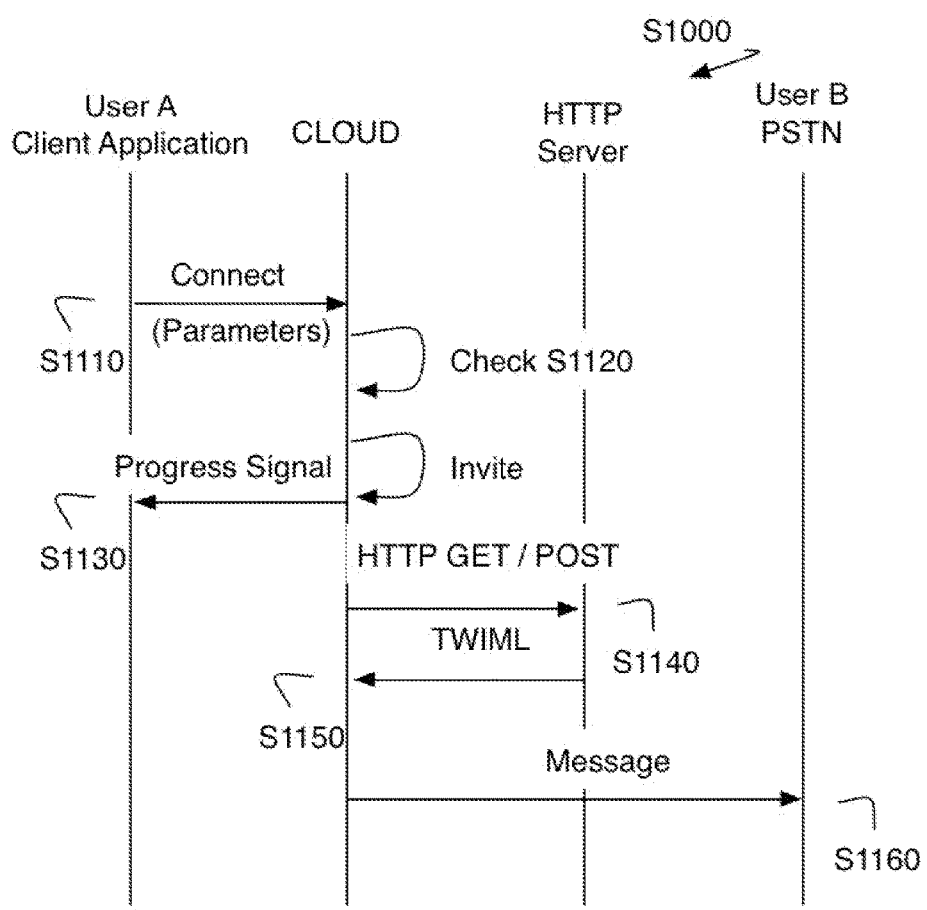
FIG. 19 is a schematic diagram of a method for sending an outgoing message from a client application in accordance with a preferred embodiment of the present invention.
Figure 26:
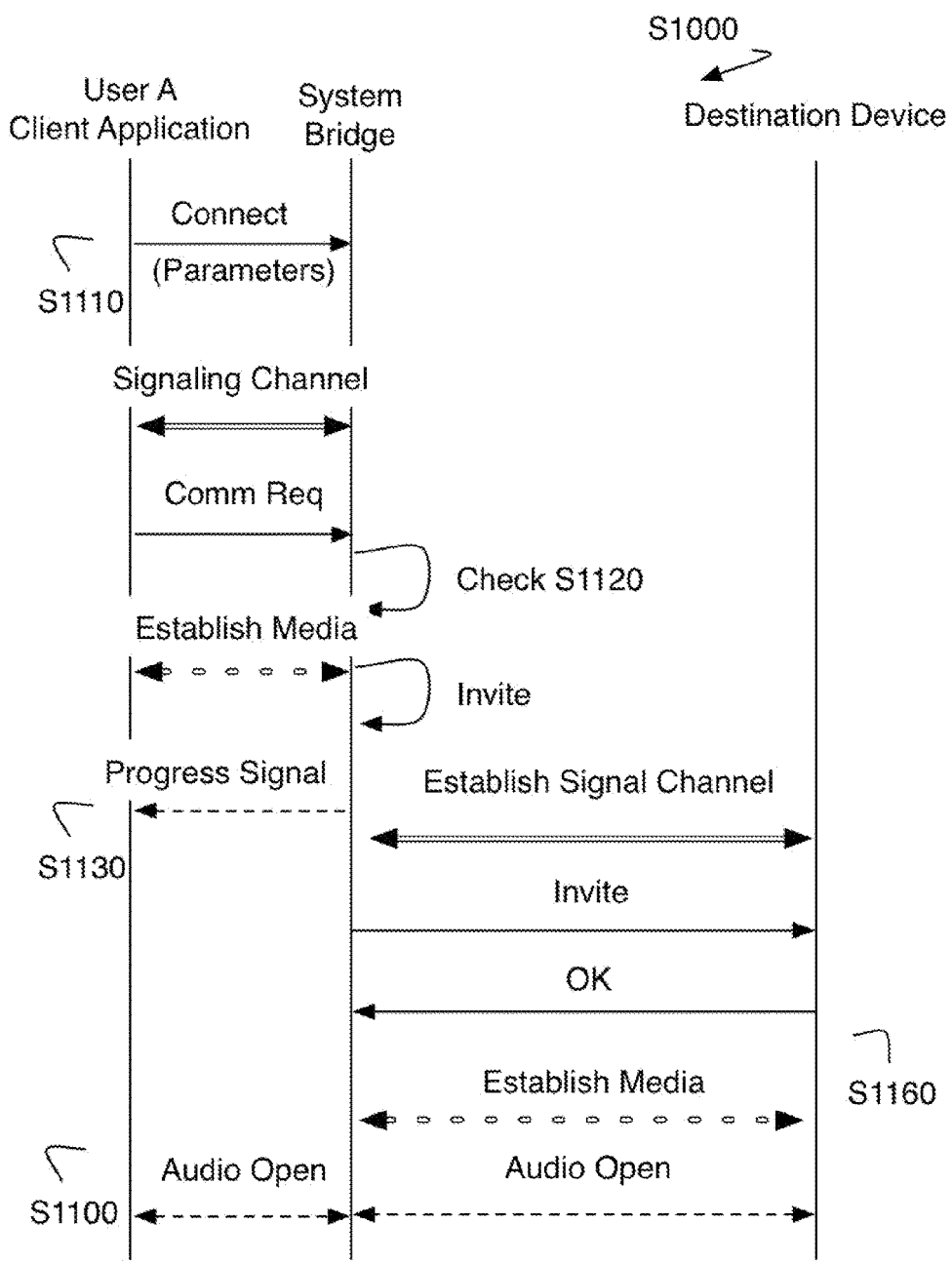
FIG. 26 is a communication flow diagram of a client application making an outgoing call.

As shown in FIGS. 18 and 19, a method S1000 of a first preferred embodiment for making outgoing communications from a client application can include receiving a connection request from a first client application S1110; verifying at least one parameter of the communication request S1120; merging the real time communication of the client with real time communication of a communication destination S1100 that can include transmitting a progress signal to the first client application S1130; retrieving communication instructions from a server according to the incoming communication request S1140; identifying an instruction to make a call to a communication destination S1150; and establishing communication with the communication destination S1160. More generally, the method allows a signaling channel and a media channel of a client application to connect to a second type of signaling channel and media channel as shown in FIG. 26. The method of the first preferred embodiment enables a client application to establish communication. The medium of communication is preferably a telephony voice based communication but may alternatively be any suitable communication medium such as video session, screen sharing, text messaging, and/or multimedia messaging. The method preferably establishes a media channel (i.e., communication session) such as an open voice channel between the first client application and at least a second endpoint. The method may alternatively perform one or more communication requests such as transmitting a message from the first client application to at least a second endpoint. As shown in FIG. 18, the method may be used for connecting a USER A that is using a client application to a USER B that is using a PSTN device. As shown in FIG. 19, the method may alternatively, be used for communicating a media message such as an SMS or MMS message from a USER A on a client application to a USER B using a PSTN device. The method as described herein, USER A can include a mobile device 14 of the type described above. USER B may be a PSTN connected device or a mobile device 14 of the type described above.

Step S1110, which includes receiving a connection request from a first client application, functions to connect a USER A of client application to the CLOUD. The CLOUD is preferably a communication platform and can include one or more functions and/or hardware systems described above with reference to cloud service 30. Preferably, the CLOUD can include one or more separate servers and/or services configured for trafficking and connecting communications between the users in accordance with the principles of the API described above. The connection Step S1110 functions to initiate communications over a predetermined protocol, such as SIP, RTMP and the like, between a mobile device and the CLOUD. The predetermined protocol is preferably an internet protocol utilizing an internet protocol such as TCP, UDP, and/or HTTP, but any suitable protocol may be used.

Receiving a connection request can include at a client device, initiating communication through a browser real-time protocol, functions to establish communication between a browser and a system bridge or communication gateway of a communication platform. The real-time communication is preferably initiated by a RTC browser module. As described below, an outside entity may initiate the communication and the browser with the RTC browser module may be the callee entity of a communication. Initiating communication through a browser preferably includes establishing a control communication channel and a real-time media communication channel. Preferably, the control communication channel is a websocket communicatively coupling the browser (e.g., the RTC browser module) and the communication platform (e.g., a RTC load balancer). The real time media communication channel is used to transfer the real-time media such as the audio, video, screen sharing, and/or other real-time media communication. The control and media communication is preferably bi-directional and full-duplex between the browser and the communication platform. The real time media communication channel preferably uses WebRTC to communication with a Secure Real Time Protocol (SRTP).

Initiating communication may additionally include selecting a communication protocol. Selecting a communication protocol preferably includes analyzing properties of the intended communication and capabilities client device. In a first preferred variation, the RTC browser module determines properties of the current client device ands selects a form of real-time communication according to that information. The current client device properties may include using the operating system version, application/browser version, connectivity quality, type of data communication (e.g., wireless internet vs. cellular data), or any suitable property that may factor into determining an optimal real-time communication type. For example, in a first browser, WebRTC may be better supported while in a second browser flash enabled RTMP may be more supported. In another variation, the properties of the other involved endpoints may be queried or determined and used in a similar manner to determine an optimal real-time communication protocol for the current RTC browser module. Endpoints and the associated device properties can preferably be determined by querying a service provided through the communication platform, but may alternatively be determined in any suitable manner. Additionally, properties of a plurality of endpoints involved in the communication may be used to determine a real-time communication protocol. For example, if the destination endpoint does not support WebRTC but the current RTC browser module and the destination support Flash enabled RTMP, it may be optimal to use Flash RTMP for the caller RTC browser module so that both endpoints use the same protocol. In yet another variation, a device may rely on presence information of a destination endpoint in selecting an optimal communication endpoint. The presence information can preferably provide data such as the availability of a user for a particular endpoint, a list of devices at which a user associated with the endpoint may be reached, and/or other information related to the presence/availability of a user at an endpoint. Presence information can preferably be collected and integrated into the communication routing such as in the system and method described in U.S. patent application Ser. No. 13/624,750, filed 21 Sep. 2012, and titled "SYSTEM AND METHOD FOR DETERMINING AND COMMUNICATING PRESENCE INFORMATION", which is hereby incorporated in its entirety by this reference.

In one variation of the method of the preferred embodiment, the connecting step S1110 can further include transmitting one or more permissions, parameters or tokens with the connection attempt. Preferably, the parameters can include one or more of a cloud system token (or security credential token) that can contain authentication credentials of USER A, a bridge token (which can have a null value in outgoing calls such as that shown in FIG. 18), and/or one or more user-defined parameters. The authentication token is preferably associated with security credentials that can authenticate and/or authorize a communication request to perform particular actions. The authorization token can preferably be used to verify if a bearer can perform a particular action and in some variations which operations to limit/permit. A communication request can be permitted to execute one or more communications. Any suitable restriction on the communications may additionally be associated with the authorization token such as number of communications, timing of communications, communication endpoints, and communication mediums. As described above, the authorization token is preferably created for a client application by a developer signing against their account key or some other suitable identifier. At the communication platform or at a service communicatively coupled to the communication platform, the authorization token can be verified against an account key provided to a developer or provider of a system using the client application. As an example, the user defined parameters can include additional constraints or conditions on the use of the system, such as for example particular users to whom calls can be placed, particular abilities of the token holder, identifiers of any applications or functions in use, or identifiers of any required recipients of communications, e.g., customer service or sales representatives. Preferably, any or all of the permissions can be consolidated into a single entity, such as the cloud system token; and any or all of the permissions can be sealed and kept invisible from USER A and partially or entirely transparent to any intermediary servers useable in the communication process.

Step S1120, which includes verifying at least one parameter of the communication request, functions to check if the connection request should be completed. Preferably, the connection request is sent with a security credential token for a user of the first client application. The security credential token is preferably checked at the CLOUD to ensure the client application is allowed to make a connection request on behalf of the user. Permissions can be stored in association with an authorization token, and the authorization token preferably received in S1110 is used to retrieve the associated permissions. The permissions are then used to determine if the communication request is allowed. Additionally or alternatively, the user defined parameters may be checked to ensure they satisfy any requirements or meet expectations. Additionally, step S1120 can preferably function to check other diagnostic functions of the communication system and identify selected ports and/or communication channels for the impending communications. For example, the CLOUD may check to ensure that the connection request is not being made when the CLOUD is an overloaded state, and that the connection request satisfies an overload policy.

Step S1100, which includes merging real time communication of the client with real time communication of a communication destination, functions to bridge real time media communication from the client application to an outside destination. Establishing the outside communication can include steps S1140, S1150, and S1160 to establish the outside communication channel according to a communication application. Alternative communication platforms may include simple mapping to a destination or use any suitable logic to determine the second leg of a real time communication channel. Merging real time communication of the client with real time communication of a communication destination preferably involves the coordination of signaling as described above with the establishment of real time communication channels between the client application, a gateway (e.g., the system bridge), and a communication destination (e.g., a communication application and/or a communication endpoint). Merging of real time communication preferably accommodates selective use of different real time communication protocols such as WebRTC or flash.

Merging can include receiving communication of the browser real-time protocol, functions to use the communication platform as a proxy for the intended destination. The control communication signaling channel and the real-time media communication channel are both preferably received at a load balancer. Regardless of a specified end destination(s), the RTC browser module preferably directs the real time communication to the communication platform, which proxies communication, directs communication traffic to subsystems with adequate capacity, and/or process communication for communicating with the other endpoint.

At the load balancer, merging can include load balancing communication to a system bridge, which functions to determine a system bridge with adequate capacity. There is preferably a plurality of system bridges, and an optimal/best-available communication router is preferably selected for processing the communication depending on load, quality metrics, regional performance, and/or suitable parameters of the communication routers. The load balancer preferably forwards the real-time communication channel(s) from the RTC browser module on to the system bridge. In particular, the load balancer establishes a control signaling communication channel using a websocket or SDP and a real-time media communication channel using SRTP. In alternative variations, the system bridge is not load balanced, and the control signaling communication channel and the real time media communication channels are directly established with the system bridge.

Prior to merging real time communication, a destination and destination media channel must be established. The method can include determining a destination, which functions to map the destination to an endpoint. Preferably the RTC browser module specifies a destination identifier that is associated with an endpoint or plurality of endpoints. A plurality of destination endpoints may additionally be specified for real-time communications for any suitable number of endpoints. In one variation, the endpoints are specified as namespace identifiers. The identifiers may be namespaced globally, within the communication platform, within an account, within an application, or namespaced in any suitable context. Namespaced destination identifiers function to enable more usable ways of establishing real-time communication between two known endpoints. In another variation, the destination endpoint is not namespaced (e.g., a telephony number or IP address), and there may not be a need to perform any mapping to an endpoint. Determining a destination may additionally include determining a destination according to a presence server at least in part. The presence server preferably allows presence information (e.g., if a user is available, busy, available at one of several possible devices, etc) to be used. In situations where a destination specifying a user has multiple possible device destinations. The type of endpoint may be used in selecting an endpoint. For example, there may be performance improvements if the endpoints do not require expensive transcoding processing, and thus the communication router may be configured to give preference device endpoints that minimize the transcoding.

Step S1130, which includes transmitting a progress signal to the first client application, functions to transmit a ringtone or confirmation message to USER A. The progress signal may take different forms depending on the communication medium. For voice or video calls, the progress signal is preferably a ringtone played for the user of the client application. In an asynchronous messaging application, the progress signal may indicate the delivery status of the message (e.g., sending, delivered, read). In some variations, the progress signal is a confirmation transmission to confirm the connection for the client application. The confirmation transmission is preferably transparent to a user and is only an acknowledgment by the CLOUD for the client application. The progress signal is preferably transmitted in response to an invite transmission within one or more of the CLOUD service. Preferably, the invite can include an application to which connection is sought, the account identification of the recipient, as well as the user defined parameters that were previously received in the CLOUD. Additionally, the invite can include a caller-identification or user identification of USER A. The invite is preferably a SIP invite but may be any suitable invite. In response to a smooth traffic flow of the invite within the one or more CLOUD servers, the CLOUD can preferably transmit the progress signal back to the mobile device via the SIP connection.

As mentioned before, merging can be used to establish media communication flow between the client application and an outside endpoint for a variety of systems. In one variation, a communication application is used to control and direct a connection. The client application can initially have a media flow between the client application and the application. For example, the application can specify audio, video, text-to-speech commands, and other interactions that should occur over the media channel. Additionally, the application can direct the media channel to connect to an outside endpoint. Any suitable number of media bridges can occur on the non-client application leg of the media connection.

In a communication application variation, step S1140, which includes retrieving communication instructions from a server according to the incoming communication request, functions to fetch instruction markup determining communication logic. Step S1140 preferably includes transmitting an HTTP request (such as a GET or POST) to the HTTP Server associated with the user account of the client application. Preferably the user account has a URL configured as a resource location of the communication instructions. Step S1140 can preferably be performed simultaneously or substantially simultaneously with one or more variations of step S1130, described above. In another variation of the method of the preferred embodiment, the HTTP request can include any or all of the permissions described above. Preferably, the HTTP request includes at least the user-defined parameters, which can be transmitted and received in an encrypted format. Alternatively, step S1140 can include verifying one or more of the user defined parameters at or by the HTTP server.

Step S1150, which includes identifying an instruction to make a call to a communication destination, functions to process the communication instructions and determine an outgoing communication destination. The communication instructions retrieved in Step S1140 are preferably transmitted as a markup language format message to the CLOUD from the HTTP Server. In one variation of the method of the preferred embodiment, the markup language format message can include one of an HTML message, an XHTML message, an SGML message, or any other suitable markup language or variation or version thereof. In another variation of the method of the preferred embodiment, the markup language format message can include a TWiML message for use with a cloud system of the assignee of the present application. The communication instructions may include any suitable logic. In making an outgoing call, the communication instructions preferably include an instruction to dial or communicate with a communication destination. Alternatively, the application could direct playing audio files, playing other media files, converting text to speech, or performing any suitable interaction over a media connection.

Step S1160, which includes establishing communication with the communication destination, functions to complete communication with the desired endpoint. Establishing communication can establish communication from the source of the communication request (e.g., USER A) and at least one party/endpoint. A plurality of destination endpoints/parties may alternatively be included in the established communication. In a first variation, the communication is preferably an open media channel (e.g., voice/audio, video, screen sharing or any suitable communication session) between the client application and a device of the communication destination. This variation preferably includes inviting the communication destination; and upon receiving acknowledgement of invite acceptance, opening a media channel between the communication destination and the first client application. The invite is preferably a SIP invite but may alternatively be any suitable invite to a media channel. This may be used to establish communication with a PSTN device and/or a second client application as described more below. In one example, a USER A is attempting to contact a PSTN USER B. Accordingly, the communication instructions can indicate that the recipient is a PSTN user, and therefore the CLOUD will preferably create an appropriate SIP invite and transmit it to an appropriate provider. As used herein, the PSTN network and/or service provider can include both mobile and landline-based telephony networks. A response is preferably received from the provider at the CLOUD service, wherein the response can include an appropriate HTTP status code such as 200 OK. Following confirmation and cross-confirmation between one or more components of the CLOUD service and the service provider, the method can open a media channel between USER A and USER B. As shown in FIG. 18, the media channel bypasses and/or is transparent to the HTTP server, but can be transmitted through one or more components of the CLOUD service. It should be understood that the media channel can also include other types of media, including at least video, screen sharing, SMS, MMS, or any other suitable communication media.

Merging real time communication of the client with real time communication of a communication destination can include processing communication according to the destination, functions to transcode, convert, or otherwise translate the media communication for the destination endpoint. The communication router preferably translates the communication from a form compatible with the RTC browser module (e.g., WebRTC or Flash RTMP) to a form compatible with the destination endpoint. The destination endpoint may be a PSTN device, a SIP/VoIP device, another browser client using WebRTC, Flash RTMP, CU-RTC-Web, proprietary communication protocol, or any suitable destination endpoint. In one variation, the communication router preferably detects if a receiving endpoint is the same type and/or compatible with the encoding used by the calling RTC browser module. If the destination is the same type or compatible then the communication router may maintain the encoding used by the calling RTC browser module to preserve the encoding. For example, when a RTC browser module is using WebRTC to communicate with another device using WebRTC then the communication router preferably maintains the encoding when routing the communication. In one example, processing communication may include transcoding between ISAC (Internet Speech Audio Codec) and G711U. In another example, processing communication may include transcoding between webm and h.264 video encodings. In another example, processing communication includes transcoding media encoded with an opus codec and transmitted over a WebRTC connection to media encoded with a PCMU codec transmitted over a SIP controlled RTMP. The real-time communication is preferably bi-directional and thus the processing of communication is preferably performed in both directions. Thus information from the destination to the RTC browser module is similarly converted to an encoding/format compatible with the RTC browser module. The media streams are transmitted between the destination and the client application. When the destination is a SIP endpoint, the communication router may establish a SIP channel. If the destination is a RTC browser module compatible with WebRTC, the communication router may mirror that of the caller, a websocket control channel and an audio SRTP channel.

In a second variation of Step S1160, establishing a communication with the communication destination can include performing one or more specific communication requests. Performing the communication request preferably includes sending an asynchronous message to the communication destination as shown in FIG. 19. An asynchronous message can be sent using protocols including SMS, MMS, IP-based messaging protocols, proprietary messaging protocols, and/or any suitable messaging protocol.

In another variation of the method of the preferred embodiment, USER A can be communicating on a mobile device having a native application, software program or set of machine executable instructions that functions to perform one or more of the steps outlined above. In one example configuration, the connect, check and invite steps S1110, S1120, S1130 or significant portions thereof can all be performed by such a native application configured with an operating system of the mobile device. As an example, certain invite and authentication procedures, including for example the cloud system token and user defined parameters associated with the application native to the user's mobile device. In such an example configuration, the mobile device can communicate directly with the HTTP server via one or more requests and/or messages of the type described above.

Figure 20:
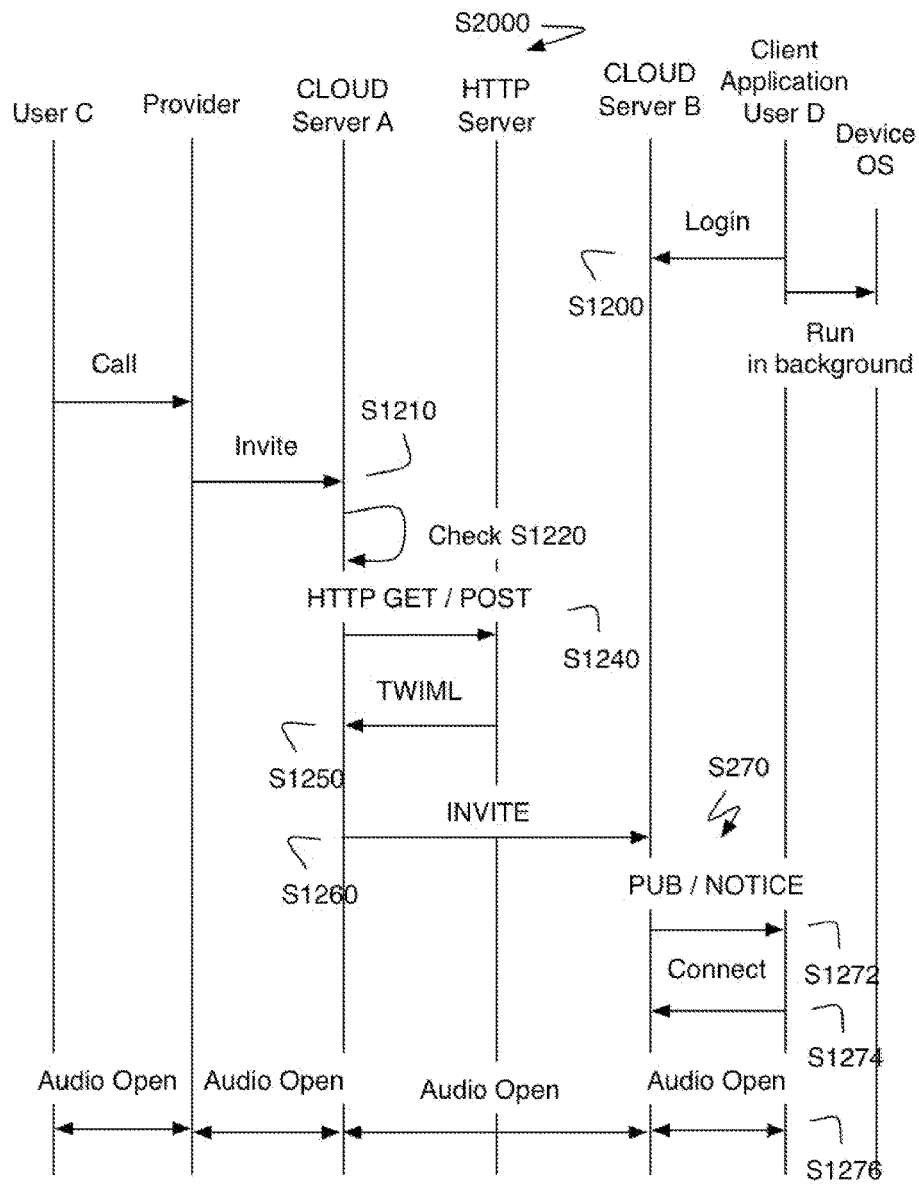
FIG. 20 is a schematic diagram of a method for establishing a media channel communication with a client application in accordance with a preferred embodiment of the present invention.
Figure 21:
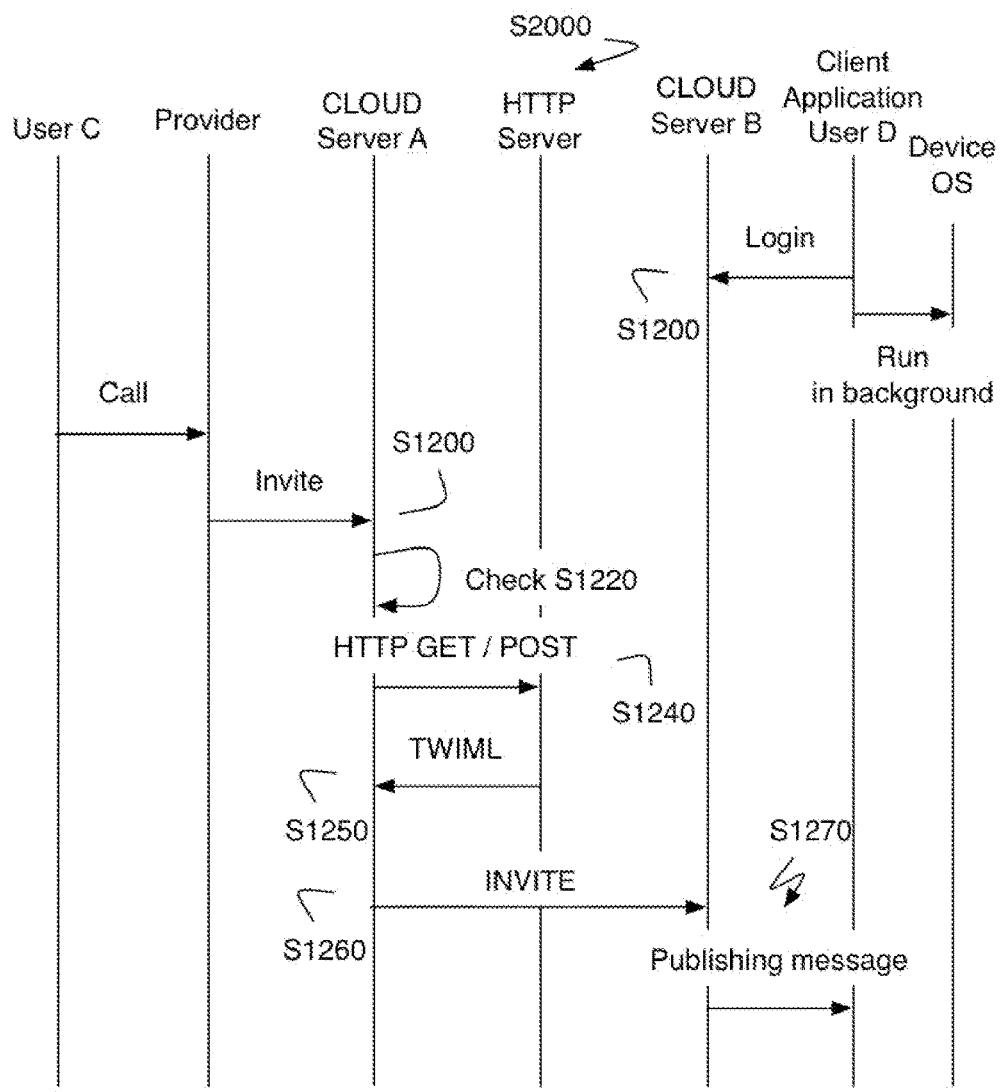
FIG. 21 is a schematic diagram of a method for sending a message communication to a client application in accordance with a preferred embodiment of the present invention.
Figure 27:
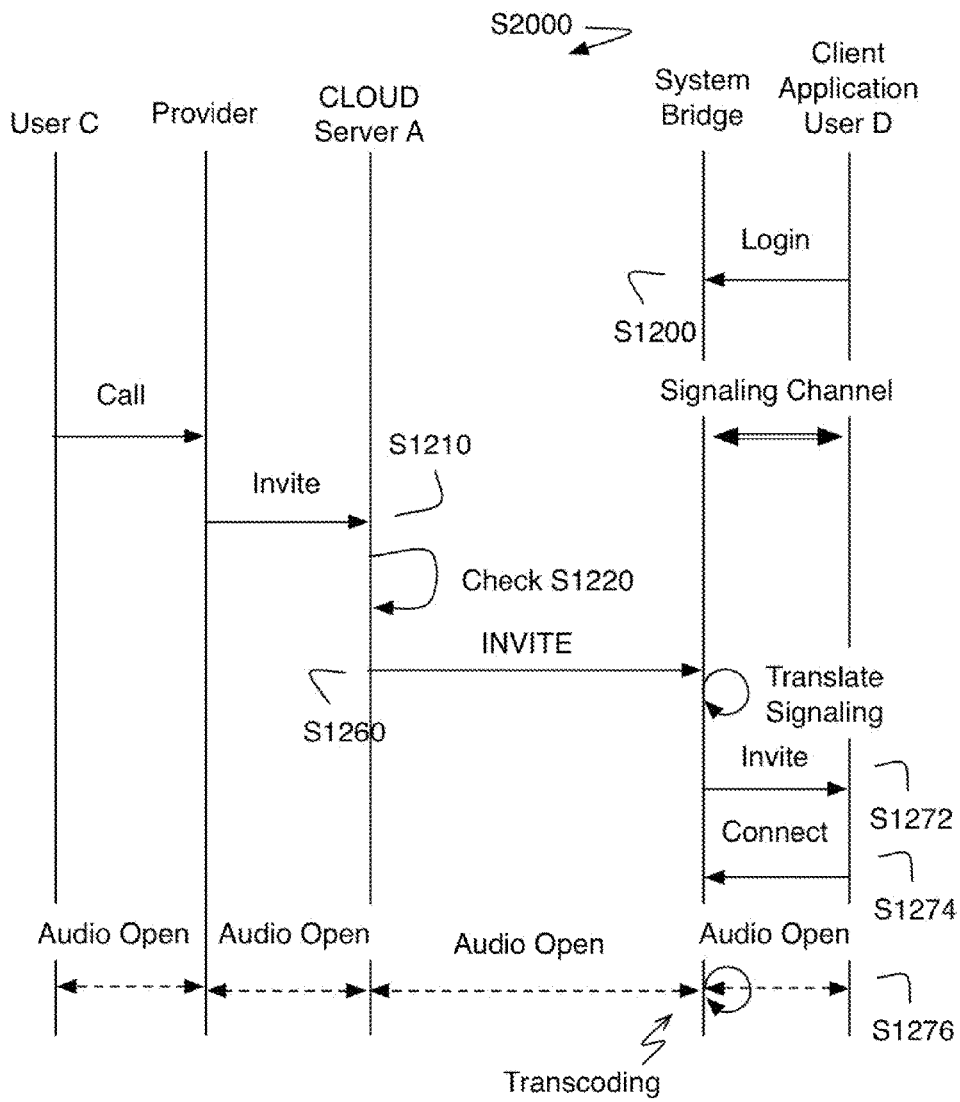
FIG. 27 is a communication flow diagram of a client application receiving an incoming call.

As shown in FIGS. 20 and 21, a method S2000 of a second preferred embodiment for receiving communication at a client application may include at a first server of a communication platform, receiving an executed login of a user of a first client application S1200; at a second server of the communication platform, accepting an incoming communication request S1210; retrieving communication instructions from a server according to the incoming communication request S1240; identifying an instruction to make a call to a communication destination of the user of the first client application S1250; forwarding the communication request to the first server of the communication platform S1260; and at the first server of the communication platform, establishing communication with the first client application S1270. The method functions to receive calls at a client application through the systems described above. The method is preferably employed to enable software applications or machine executable instructions running natively on a mobile device to interface with a telephony or communication platform. The method may be used such that a PSTN device or any suitable communication capable device may contact the client application. The method may be used for voice, video, SMS, MMS, IP based messaging, proprietary messaging, and/or any suitable communication medium. More generally, the method S2000 of making inbound calls directed at the client allows a client application to establish a signaling channel, then for an outside calling entity (e.g., an application, a PSTN device, a SIP device and the like) to initiate a communication request, subsequently a signaling channel and a media channel are established between a system bridge and the calling entity (or a proxy of the calling entity), a media channel is established between the system bridge and the client application, and then the signaling and media channels are merged as shown in FIG. 27. Media may be transcoded such that media formats are compatible for transmitting between the two media channels. Additionally, registration of a client identifier for the client signaling channel can be used by incoming communication requests to specify an intended client application. The method may be used in combination with the method above for making outgoing communications from a client application such that a first client application may contact a client application. The pairs of steps S1110 and S1210, S1120 and S1220, S1140 and S1240, and S1150 and S1250 may in some variations be substantially similar to their corresponding step.

Step S1200, which includes at a first server of a communication platform, receiving an executed login of a user of a first client application, functions to establish a connection of a user to a communication platform/CLOUD system. The user preferably uses a mobile device having a native application (with a client application) of the type described above, but any suitable device with a client application may be used. Preferably, when USER D logs into his account on CLOUD B, a URL subscription <userd_sid>/USERD is established in CLOUD B such that USER D will receive any messages published to that URL. Example messages can include voice, video, SMS, MMS, email or any other suitable type of electronic communication audible or readable on a mobile device.

Step S1210, which includes at a second server of the communication platform, accepting an incoming communication request, functions to initiate a call from a caller (e.g., USER C) to the user of the first client application (e.g., USER D). As shown in FIG. 5, the call initiation can be processed at a service provider, such as for example a PSTN service provider for a mobile telephony or landline telephony network. The service provider can function to receive a telephonic communication (voice, SMS, MMS) and convert that incoming communication into an SIP request transmittable to CLOUD A. Alternatively, the caller may be initiated by device using a second client application, and the outgoing call may be established in manner substantially similar to that of the method for making outgoing communications from a client application. In step S1220 of the method of the preferred embodiment, CLOUD A will perform a check of the received SIP invite, which can include checking a recipient account, a voice URL for the account, an SMS or MMS URL for the account and/or any other account-specific or user specific permissions or preferences associated with the account of USER D. In the variation where a call is initiated from a second client application, the method S2000 may include transmitting a progress signal to the second client application, which is substantially similar to Step S1130.

Steps S1240 and S1250, which include retrieving communication instructions from a server according to the incoming communication request and identifying an instruction to make a call to a communication destination of the user of the first client application, function to process the application logic of a communication platform application. Step S1240 of the method of the preferred embodiment preferably includes transmitting an HTTP request from CLOUD A to the users HTTP Server in response to a successful check of the recipient's credentials. As an example, once CLOUD A identifies a voice URL associated with USER D's account, CLOUD A can transmit an HTTP GET/POST request to USER D's HTTP Server. Step S1250 of the method of the preferred embodiment preferably processes the communication instructions and determine an outgoing communication destination corresponding to the user of the first client application. A markup language format message is preferably received at CLOUD A from the HTTP Server. In one variation of the method of the preferred embodiment, the markup language format message can include one of an HTML message, an XHTML message, an SGML message, or any other suitable markup language or variation or version thereof. In another variation of the method of the preferred embodiment, the markup language format message can include a TWiML message for use with a cloud system of the assignee of the present application.

Step S1260, which includes forwarding the communication request to the first server of the communication platform functions to communicate the incoming communication request to a portion of the CLOUD that manages the logged in user. For media channels communication requests such as voice or video calls, an invite request is transmitted from CLOUD A to CLOUD B in response to the receipt of the markup language format message from USER D's HTTP Server. Preferably, the invite request contains at least an account identification for USER D and a client name (USER D) associated with the account during the login step S1200. The invite request is preferably a SIP invite as is known in the art. In the case of an asynchronous messaging, the text, and/or media message may be contained in the communication message sent to the server of CLOUD B as shown in FIG. 20. The first server of the communication platform may additionally or alternatively include or function as a subscription manager of the communication platform. The communication request may subsequently be forwarded to an appropriate server to manage the subscription or login session of the user of the first client application.

Step S1270, which includes at the first server of the communication platform, establishing communication with the first client application; functions to complete the communication request initiated in Step S1200. Step S1270 preferably completes the communication request between the entity of the incoming communication request (e.g., USER C) and the user of the first client application (e.g., USER D). Establishing communication with the first client application preferably includes publishing a notification to the first client application S1272. In one variation of the method of the preferred embodiment, CLOUD B can publish an invite message to USER D's URL while simultaneously causing the caller, USER C, to hear a ringtone. In Step S1272 CLOUD B can receive the publication of the invite message and broadcast it to all registered listeners, i.e., those users associated with the account established in step S1200. Establishing communication with the first client application may include varying steps depending on if the method is employed for establishing a media channel between two parties or for sending a message from one entity to a user of the first client application.

Establishing communication for a media channel communication request can additionally include receiving a connection acceptance by the first client application S1274; and opening a media channel with the first client application upon connection S1276. If USER D agrees to accept the incoming call, then he will transmit a connection acceptance to CLOUD B as shown in step S1274. The acceptance can include the transmission of one or more permissions with the connection acceptance. Preferably, the permissions can include one or more of a cloud system token containing the security credentials of USER D (which can have a null value since the call is being received in FIG. 20), a bridge token (which might have been copied from the invitation from CLOUD B), and one or more user defined parameters. In another variation of the method of the preferred embodiment, CLOUD B step S1274 can also include checking the one or more permissions at CLOUD B, which can include for example checking if there are a predetermined number of parameters (even though one or more can be null). Alternatively, step S1274 can further include unpacking the bridge token to identify an IP address associated with one or more CLOUD A or CLOUD B servers to ensure that communications are properly routed and merged through the appropriate portion of CLOUD A or CLOUD B, i.e., a bridge portion of one of the respective CLOUD services. In another variation of the method or the preferred embodiment, step S1274 can include bridging the call between USER C and USER D in response to a bridge token associated with the connection request from USER D.

In another variation of the method of the preferred embodiment, step S1274 can recite responding from the provider to the CLOUD service, wherein the response can include an appropriate HTTP status code such as 200 OK. Following confirmation and cross-confirmation between one or more components of the CLOUD service and the service provider, step S1216 of the method of the preferred embodiment recites opening an audio channel between USER C and USER D. As shown in FIG. 20, the audio channel bypasses and/or is transparent to the HTTP server, but can be transmitted through one or more components of the CLOUD A and CLOUD B components.

In another variation of the method of the preferred embodiment, USER D can be communicating on a mobile device having a native application, software program or set of machine executable instructions that functions to perform one or more of the steps outlined above. In one example configuration, the login, pub/notice and connect steps S1200, S1272, S1274 or significant portions thereof can all be performed by such a native application configured with an operating system of the mobile device. As an example, certain invite and authentication procedures, including for example the cloud system token and user defined parameters associated with the application native to the user's mobile device. In such an example configuration, the mobile device can communicate directly with the HTTP server via one or more requests and/or messages of the type described above.

As shown in FIGS. 20 and 21, the cloud services can be broken in to two or more segments, including for example CLOUD A and CLOUD B. Those of skill the art will appreciate that these designations are for illustrative and descriptive ease only, and that CLOUD A and CLOUD B can include a single computer/server having multiple functions or multiple discrete computers/servers having unique functions, depending upon the particular configuration sought by the user. The method of the preferred embodiment can be configured partially or entirely in a computer-readable medium storing computer-readable instructions. The instructions are preferably executed by computer-executable components preferably integrated with a mobile devices, one or more portions of the cloud system and the HTTP servers. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
    at a system bridge of a WebRTC real-time client communication hardware system, establishing a persistent client subscription connection with an external WebRTC client device;
    receiving from an external system an incoming communication request at the system bridge, the incoming communication request being directed to the external WebRTC client device;
    publishing an incoming communication notification from the system bridge to the WebRTC client device via the persistent client subscription connection;
    receiving a client communication at the system bridge from the WebRTC client device; and
    the system bridge merging the incoming communication request into the client communication at the system bridge by connecting the incoming communication request to the WebRTC client device by using a WebRTC communication protocol,
    wherein the system bridge merging the incoming communication request into the client communication at the system bridge comprises: the hardware system:
        opening a first audio channel between the client device and the system bridge,
        opening a second audio channel between the system bridge and a server of the hardware system, and
        opening a third audio channel between the server and the external system.

2. The method of claim 1, the method further comprising: the hardware system providing voice media communication between the external system and the client device via the first audio channel, the second audio channel, and the third audio channel.

3. The method of claim 1, wherein the external system is a PSTN service provider system, and wherein the external PSTN service provider system opens a fourth audio channel between the PSTN service provider system and a PSTN user device.

4. The method of claim 3, wherein voice media communication between the PSTN user device and the client device is provided via the first audio channel, the second audio channel, the third audio channel, and the fourth audio channel.

5. The method of claim 4, wherein the hardware system publishes the incoming communication notification from the system bridge to the client device based on the incoming communication request received from the external system.

6. The method of claim 5, wherein the external system is external to the external client device and external to the real-time client communication hardware system, and wherein the external client device is external to the real-time client communication hardware system.

7. The method of claim 6, wherein the external client device provides the system bridge with the client communication based on the incoming communication notification received by the client device from the system bridge.

8. The method of claim 7, wherein the WebRTC protocol is an application-based real-time communication protocol.

9. The method of claim 2, wherein the external system is a WebRTC client device.

10. The method of claim 2, wherein the first audio channel between the WebRTC client device and the system bridge is a WebRTC audio channel.

11. The method of claim 8, wherein the first audio channel between the WebRTC client device and the system bridge is a WebRTC audio channel.

12. The method of claim 1, wherein the WebRTC protocol is an application-based real-time communication protocol.

* * * * *